United States Patent
Vashisht et al.

(10) Patent No.: US 11,271,955 B2
(45) Date of Patent: Mar. 8, 2022

(54) PLATFORM AND METHOD FOR RETROACTIVE RECLASSIFICATION EMPLOYING A CYBERSECURITY-BASED GLOBAL DATA STORE

(71) Applicant: FireEye, Inc., Milpitas, CA (US)

(72) Inventors: Sai Vashisht, Morgan Hill, CA (US); Alexander Otvagin, Campbell, CA (US)

(73) Assignee: FireEye Security Holdings US LLC, Milpitas, CA (US)

( * ) Notice: Subject to any disclaimer, the term of this patent is extended or adjusted under 35 U.S.C. 154(b) by 236 days.

(21) Appl. No.: 16/222,501

(22) Filed: Dec. 17, 2018

(65) Prior Publication Data

US 2019/0207967 A1     Jul. 4, 2019

Related U.S. Application Data

(60) Provisional application No. 62/611,491, filed on Dec. 28, 2017.

(51) Int. Cl.
    *H04L 29/06*     (2006.01)
    *G06F 16/245*     (2019.01)
    *G06F 16/28*     (2019.01)

(52) U.S. Cl.
    CPC ........ *H04L 63/1425* (2013.01); *G06F 16/245* (2019.01); *G06F 16/285* (2019.01);
(Continued)

(58) Field of Classification Search
    CPC . H04L 63/1425; H04L 63/1416; H04L 63/20; G06F 16/245; G06F 16/285
    See application file for complete search history.

(56) References Cited

U.S. PATENT DOCUMENTS

| | | |
|---|---|---|
| 4,292,580 A | 9/1981 | Ot et al. |
| 5,175,732 A | 12/1992 | Hendel et al. |
| (Continued) | | |

FOREIGN PATENT DOCUMENTS

| | | |
|---|---|---|
| GB | 2439806 A | 1/2008 |
| GB | 2490431 A | 10/2012 |
| (Continued) | | |

OTHER PUBLICATIONS

"Mining Specification of Malicious Behavior"—Jha et al., UCSB, Sep. 2007 https://www.cs.ucsb.edu/.about.chris/research/doc/esec07.sub.--mining.pdf-.

(Continued)

*Primary Examiner* — Taghi T Arani
*Assistant Examiner* — Lin Chang
(74) *Attorney, Agent, or Firm* — Rutan & Tucker, LLP

(57) ABSTRACT

A system for detecting artifacts associated with a cyber-attack features a cybersecurity intelligence hub remotely located from and communicatively coupled to one or more network devices via a network. The hub includes a data store and retroactive reclassification logic. The data store includes stored meta-information associated with each prior evaluated artifact of a plurality of prior evaluated artifacts. Each meta-information associated with a prior evaluated artifact of the plurality of prior evaluated artifacts includes a verdict classifying the prior evaluated artifact as a malicious classification or a benign classification. The retroactive reclassification logic is configured to analyze the stored meta-information associated with the prior evaluated artifact and either (a) identify whether the verdict associated with the prior evaluated artifact is in conflict with trusted cybersecurity intelligence or (b) identify inconsistent verdicts for the same prior evaluated artifact.

22 Claims, 12 Drawing Sheets

(52) U.S. Cl.
CPC ...... H04L 63/1408 (2013.01); H04L 63/1416 (2013.01); H04L 63/20 (2013.01)

(56) References Cited

U.S. PATENT DOCUMENTS

| | | | |
|---|---|---|---|
| 5,319,776 A | 6/1994 | Hile et al. | |
| 5,440,723 A | 8/1995 | Arnold et al. | |
| 5,490,249 A | 2/1996 | Miller | |
| 5,657,473 A | 8/1997 | Killean et al. | |
| 5,802,277 A | 9/1998 | Cowland | |
| 5,842,002 A | 11/1998 | Schnurer et al. | |
| 5,960,170 A | 9/1999 | Chen et al. | |
| 5,978,917 A | 11/1999 | Chi | |
| 5,983,348 A | 11/1999 | Ji | |
| 6,088,803 A | 7/2000 | Tso et al. | |
| 6,092,194 A | 7/2000 | Touboul | |
| 6,094,677 A | 7/2000 | Capek et al. | |
| 6,108,799 A | 8/2000 | Boulay et al. | |
| 6,154,844 A | 11/2000 | Touboul et al. | |
| 6,269,330 B1 | 7/2001 | Cidon et al. | |
| 6,272,641 B1 | 8/2001 | Ji | |
| 6,279,113 B1 | 8/2001 | Vaidya | |
| 6,298,445 B1 | 10/2001 | Shostack et al. | |
| 6,357,008 B1 | 3/2002 | Nachenberg | |
| 6,424,627 B1 | 7/2002 | Sorhaug et al. | |
| 6,442,696 B1 | 8/2002 | Wray et al. | |
| 6,484,315 B1 | 11/2002 | Ziese | |
| 6,487,666 B1 | 11/2002 | Shanklin et al. | |
| 6,493,756 B1 | 12/2002 | O'Brien et al. | |
| 6,550,012 B1 | 4/2003 | Villa et al. | |
| 6,775,657 B1 | 8/2004 | Baker | |
| 6,831,893 B1 | 12/2004 | Ben Nun et al. | |
| 6,832,367 B1 | 12/2004 | Choi et al. | |
| 6,895,550 B2 | 5/2005 | Kanchirayappa et al. | |
| 6,898,632 B2 | 5/2005 | Gordy et al. | |
| 6,907,396 B1 | 6/2005 | Muttik et al. | |
| 6,941,348 B2 | 9/2005 | Petry | |
| 6,971,097 B1 | 11/2005 | Wallman | |
| 6,981,279 B1 | 12/2005 | Arnold et al. | |
| 7,007,107 B1 | 2/2006 | Ivchenko et al. | |
| 7,028,179 B2 | 4/2006 | Anderson et al. | |
| 7,043,757 B2 | 5/2006 | Hoefelmeyer et al. | |
| 7,058,822 B2 | 6/2006 | Edery et al. | |
| 7,069,316 B1 | 6/2006 | Gryaznov | |
| 7,080,407 B1 | 7/2006 | Zhao et al. | |
| 7,080,408 B1 | 7/2006 | Pak et al. | |
| 7,093,002 B2 | 8/2006 | Wolff et al. | |
| 7,093,239 B1 | 8/2006 | van der Made | |
| 7,096,498 B2 | 8/2006 | Judge | |
| 7,100,201 B2 | 8/2006 | Izatt | |
| 7,107,617 B2 | 9/2006 | Hursey et al. | |
| 7,159,149 B2 | 1/2007 | Spiegel et al. | |
| 7,213,260 B2 | 5/2007 | Judge | |
| 7,231,667 B2 | 6/2007 | Jordan | |
| 7,240,364 B1 | 7/2007 | Branscomb et al. | |
| 7,240,368 B1 | 7/2007 | Roesch et al. | |
| 7,243,371 B1 | 7/2007 | Kasper et al. | |
| 7,249,175 B1 | 7/2007 | Donaldson | |
| 7,287,278 B2 | 10/2007 | Liang | |
| 7,308,716 B2 | 12/2007 | Danford et al. | |
| 7,328,453 B2 | 2/2008 | Merkle, Jr. et al. | |
| 7,346,486 B2 | 3/2008 | Ivancic et al. | |
| 7,356,736 B2 | 4/2008 | Natvig | |
| 7,386,888 B2 | 6/2008 | Liang et al. | |
| 7,392,542 B2 | 6/2008 | Bucher | |
| 7,418,729 B2 | 8/2008 | Szor | |
| 7,428,300 B1 | 9/2008 | Drew et al. | |
| 7,441,272 B2 | 10/2008 | Durham et al. | |
| 7,448,084 B1 | 11/2008 | Apap et al. | |
| 7,458,098 B2 | 11/2008 | Judge et al. | |
| 7,464,404 B2 | 12/2008 | Carpenter et al. | |
| 7,464,407 B2 | 12/2008 | Nakae et al. | |
| 7,467,408 B1 | 12/2008 | O'Toole, Jr. | |
| 7,478,428 B1 | 1/2009 | Thomlinson | |
| 7,480,773 B1 | 1/2009 | Reed | |
| 7,487,543 B2 | 2/2009 | Arnold et al. | |
| 7,496,960 B1 | 2/2009 | Chen et al. | |
| 7,496,961 B2 | 2/2009 | Zimmer et al. | |
| 7,519,990 B1 | 4/2009 | Xie | |
| 7,523,493 B2 | 4/2009 | Liang et al. | |
| 7,530,104 B1 | 5/2009 | Thrower et al. | |
| 7,540,025 B2 | 5/2009 | Tzadikario | |
| 7,546,638 B2 | 6/2009 | Anderson et al. | |
| 7,565,550 B2 | 7/2009 | Liang et al. | |
| 7,568,233 B1 | 7/2009 | Szor et al. | |
| 7,584,455 B2 | 9/2009 | Ball | |
| 7,603,715 B2 | 10/2009 | Costa et al. | |
| 7,607,171 B1 | 10/2009 | Marsden et al. | |
| 7,639,714 B2 | 12/2009 | Stolfo et al. | |
| 7,644,441 B2 | 1/2010 | Schmid et al. | |
| 7,657,419 B2 | 2/2010 | van der Made | |
| 7,676,841 B2 | 3/2010 | Sobchuk et al. | |
| 7,698,548 B2 | 4/2010 | Shelest et al. | |
| 7,707,633 B2 | 4/2010 | Danford et al. | |
| 7,712,136 B2 | 5/2010 | Sprosts et al. | |
| 7,730,011 B1 | 6/2010 | Deninger et al. | |
| 7,739,740 B1 | 6/2010 | Nachenberg et al. | |
| 7,779,463 B2 | 8/2010 | Stolfo et al. | |
| 7,784,097 B1 | 8/2010 | Stolfo et al. | |
| 7,832,008 B1 | 11/2010 | Kraemer | |
| 7,836,502 B1 | 11/2010 | Zhao et al. | |
| 7,849,506 B1 | 12/2010 | Dansey et al. | |
| 7,854,007 B2 | 12/2010 | Sprosts et al. | |
| 7,869,073 B2 | 1/2011 | Oshima | |
| 7,877,803 B2 | 1/2011 | Enstone et al. | |
| 7,904,959 B2 | 3/2011 | Sidiroglou et al. | |
| 7,908,660 B2 | 3/2011 | Bahl | |
| 7,930,738 B1 | 4/2011 | Petersen | |
| 7,937,387 B2 | 5/2011 | Frazier et al. | |
| 7,937,761 B1 | 5/2011 | Bennett | |
| 7,949,849 B2 | 5/2011 | Lowe et al. | |
| 7,996,556 B2 | 8/2011 | Raghavan et al. | |
| 7,996,836 B1 | 8/2011 | McCorkendale et al. | |
| 7,996,904 B1 | 8/2011 | Chiueh et al. | |
| 7,996,905 B2 | 8/2011 | Arnold et al. | |
| 8,006,305 B2 | 8/2011 | Aziz | |
| 8,010,667 B2 | 8/2011 | Zhang et al. | |
| 8,020,206 B2 | 9/2011 | Hubbard et al. | |
| 8,028,338 B1 | 9/2011 | Schneider et al. | |
| 8,042,184 B1 | 10/2011 | Batenin | |
| 8,045,094 B2 | 10/2011 | Teragawa | |
| 8,045,458 B2 | 10/2011 | Alperovitch et al. | |
| 8,056,136 B1 * | 11/2011 | Zaitsev | G06F 21/56 726/24 |
| 8,069,484 B2 | 11/2011 | McMillan et al. | |
| 8,087,086 B1 | 12/2011 | Lai et al. | |
| 8,171,553 B2 | 5/2012 | Aziz et al. | |
| 8,176,049 B2 | 5/2012 | Deninger et al. | |
| 8,176,480 B1 | 5/2012 | Spertus | |
| 8,191,147 B1 | 5/2012 | Gardner et al. | |
| 8,201,246 B1 | 6/2012 | Wu et al. | |
| 8,204,984 B1 | 6/2012 | Aziz et al. | |
| 8,214,905 B1 | 7/2012 | Doukhvalov et al. | |
| 8,220,055 B1 | 7/2012 | Kennedy | |
| 8,225,288 B2 | 7/2012 | Miller et al. | |
| 8,225,373 B2 | 7/2012 | Kraemer | |
| 8,233,882 B2 | 7/2012 | Rogel | |
| 8,234,640 B1 | 7/2012 | Fitzgerald et al. | |
| 8,234,709 B2 | 7/2012 | Viljoen et al. | |
| 8,239,944 B1 | 8/2012 | Nachenberg et al. | |
| 8,260,914 B1 | 9/2012 | Ranjan | |
| 8,266,091 B1 | 9/2012 | Gubin et al. | |
| 8,286,251 B2 | 10/2012 | Eker et al. | |
| 8,291,499 B2 | 10/2012 | Aziz et al. | |
| 8,307,435 B1 | 11/2012 | Mann et al. | |
| 8,307,443 B2 | 11/2012 | Wang et al. | |
| 8,312,545 B2 | 11/2012 | Fuvell et al. | |
| 8,321,936 B1 | 11/2012 | Green et al. | |
| 8,321,941 B1 | 11/2012 | Fuvell et al. | |
| 8,332,571 B1 | 12/2012 | Edwards, Sr. | |
| 8,365,286 B2 | 1/2013 | Poston | |
| 8,365,297 B1 | 1/2013 | Parshin et al. | |
| 8,370,938 B1 | 2/2013 | Daswani et al. | |
| 8,370,939 B2 | 2/2013 | Zaitsev et al. | |

(56) References Cited

U.S. PATENT DOCUMENTS

| | | |
|---|---|---|
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Viz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,769,683 B1 | 7/2014 | Oliver |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,280,663 B2 | 3/2016 | Pak et al. |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1* | 4/2016 | Manni ................ H04L 63/1433 |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1* | 8/2016 | Khalid ................ H04L 63/1425 |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |

(56) References Cited

U.S. PATENT DOCUMENTS

| | | |
|---|---|---|
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,172,022 B1 | 1/2019 | Wahlstrom et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,230,749 B1 | 3/2019 | Rostami-Hesarsorkh et al. |
| 10,242,185 B1 | 3/2019 | Goradia |
| 10,701,175 B1 * | 6/2020 | Kolcz .................. G06Q 30/00 |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |

(56) References Cited

U.S. PATENT DOCUMENTS

| | | |
|---|---|---|
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0104046 A1 | 5/2008 | Singla et al. |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Proves et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0164522 A1 | 6/2009 | Fahey |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0162395 A1 | 6/2010 | Kennedy |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1* | 2/2011 | Mahaffey .............. G06F 21/564 726/1 |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145926 A1 | 6/2011 | Dalcher et al. |
| 2011/0145934 A1 | 6/2011 | Abramovici et al. |
| 2011/0162070 A1 | 6/2011 | Krasser et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |

(56) References Cited

U.S. PATENT DOCUMENTS

| | | |
|---|---|---|
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupar et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0095264 A1 | 4/2014 | Grosz |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0088967 A1 | 3/2015 | Muttik |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0142813 A1* | 5/2015 | Burgmeier ............ G06F 16/285 707/740 |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2015/0373043 A1 | 12/2015 | Wang et al. |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0048276 A1 | 2/2017 | Bailey et al. |
| 2017/0063909 A1 | 3/2017 | Muddu et al. |
| 2017/0083703 A1 | 3/2017 | Abbasi et al. |
| 2017/0180395 A1* | 6/2017 | Stransky-Heilkron ...................... H04L 63/1416 |
| 2017/0251003 A1 | 8/2017 | Rostami-Hesarsorkh et al. |
| 2018/0013770 A1 | 1/2018 | Ismael |
| 2018/0033089 A1 | 2/2018 | Goldman et al. |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |
| 2019/0207966 A1 | 7/2019 | Vashisht et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.isp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance

(56) References Cited

OTHER PUBLICATIONS

Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris , "Extracting syslog data out of raw pcap dumps, seclists.org, Honeypots mailing list archives", available at http://seclists.org/honeypots/2003/q2/319 ("Boubalos"), (Jun. 5, 2003).

Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cohen, M.I., "PyFlag—An advanced network forensic framework", Digital investigation 5, Elsevier, (2008), pp. S112-S120.

Costa, M., et al., "Vigilante: End-to-End Containment of Internet Worms", SOSP '05, Association for Computing Machinery, Inc., Brighton U.K., (Oct. 23-26, 2005).

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

Distler, "Malware Analysis: An Introduction", SANS Institute InfoSec Reading Room, SANS Institute, (2007).

Dunlap, George W., et al., "ReVirt: Enabling Intrusion Analysis through Virtual-Machine Logging and Replay", Proceeding of the 5th Symposium on Operating Systems Design and Implementation, USENIX Association, ( "Dunlap"), (Dec. 9, 2002).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Goel, et al.. Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].

Heng Yin et al., Panorama: Capturing System-Wide Information Flow for Malware Detection and Analysis, Research Showcase @ CMU, Carnegie Mellon University, 2007.

Hiroshi Shinotsuka, Malware Authors Using New Techniques to Evade Automated Threat Analysis Systems, Oct. 26, 2012, http://www.symantec.com/connect/blogs/, pp. 1-4.

Idika et al., A-Survey-of-Malware-Detection-Techniques, Feb. 2, 2007, Department of Computer Science, Purdue University.

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike , "Designing Network Security", ("Kaeo"), (Nov. 2003).

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).

Kim, H., et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King"), (2003).

Kreibich, C., et al., "Honeycomb-Creating Intrusion Detection Signatures Using Honeypots", 2nd Workshop on Hot Topics in Networks (HotNets-11), Boston, USA, (2003).

Kristoff, J., "Botnets, Detection and Mitigation: DNS-Based Techniques", NU Security Day, (2005), 23 pages.

Lastline Labs, The Threat of Evasive Malware, Feb. 25, 2013, Lastline Labs, pp. 1-8.

Li et al., A VMM-Based System Call Interposition Framework for Program Monitoring, Dec. 2010, IEEE 16th International Conference on Parallel and Distributed Systems, pp. 706-711.

Lindorfer, Martina, Clemens Kolbitsch, and Paolo Milani Comparetti. "Detecting environment-sensitive malware." Recent Advances in Intrusion Detection. Springer Berlin Heidelberg, 2011.

Marchette, David J., "Computer Intrusion Detection and Network Monitoring: A Statistical Viewpoint", ("Marchette"), (2001).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard fora NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.—N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Thomas H. Ptacek, and Timothy N. Newsham , "Insertion, Evasion, and Denial of Service: Eluding Network Intrusion Detection", Secure Networks, ("Ptacek"), (Jan. 1998).

Venezia, Paul, "NetDetector Captures Intrusions", InfoWorld Issue 27, ("Venezia"), (Jul. 14, 2003).

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

(56) References Cited

OTHER PUBLICATIONS

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

U.S. Appl. No. 16/223,107, filed Dec. 17, 2018 Notice of Allowance dated Sep. 13, 2021.

"Fire Eye Introduces Cloud MVX and MVX Smart Grid" [Online], Nov. 3, 2016 [Retrieved on: Nov. 13, 2020], Fire Eye, Retrieved from: <https://www.fireeye.com/company/press-releases/2016/fireeye-introduces-cloud-mvx-and-mvx-smart-grid-the-most-intell.html> (Year: 2016).

PCT/US2018/066964 filed Dec. 20, 2018 International Search Report and Written Opinion dated Mar. 15, 2019.

U.S. Appl. No. 16/222,194, filed Dec. 17, 2018 Final Office Action dated Jan. 21, 2021.

U.S. Appl. No. 16/222,194, filed Dec. 17, 2018 Non-Final Office Action dated Aug. 30, 2021.

U.S. Appl. No. 16/222,194, filed Dec. 17, 2018 Non-Final Office Action dated Jul. 20, 2020.

U.S. Appl. No. 16/223,107, filed Dec. 17, 2018 Final Office Action dated Jun. 8, 2021.

U.S. Appl. No. 16/223,107, filed Dec. 17, 2018 Non-Final Office Action dated Nov. 24, 2020.

\* cited by examiner

PLATFORM AND METHOD FOR RETROACTIVE RECLASSIFICATION EMPLOYING A CYBERSECURITY-BASED GLOBAL DATA STORE

CROSS-REFERENCE TO RELATED APPLICATIONS

This application claims the benefit of priority on U.S. Provisional Application No. 62/611,491 filed Dec. 28, 2017, the entire contents of which are incorporated by reference herein

FIELD

Embodiments of the disclosure relate to the field of cybersecurity. More specifically, one embodiment of the disclosure relates to a comprehensive cybersecurity platform with reclassification of prior evaluated artifacts.

GENERAL BACKGROUND

Cybersecurity attacks have become a pervasive problem for organizations as many networked devices and other resources have been subjected to attack and compromised. A cyber-attack constitutes a threat to security arising out of stored or in-transit data which, for example, may involve the infiltration of any type of content, such as software for example, onto a network device with the intent to perpetrate malicious or criminal activity or even a nation-state attack (e.g., "malware").

Recently, malware detection has undertaken many approaches involving network-based, malware protection services. One conventional approach involves placement of malware detection devices at the periphery of and throughout an enterprise network. This approach is adapted to (i) analyze information propagating over the network to determine a level of suspiciousness and (ii) conduct a further analysis of the suspicious information by a separate malware detection system or internally within the malware detection device itself. While successful in detecting known malware that is attempting to infect network devices connected to the network (or subnetwork), as network traffic increases, the malware detection devices may exhibit a decrease in performance, especially in detecting advanced (or unknown) malware due to their limited accessibility to cybersecurity intelligence.

Currently, no concentrated efforts have been made to leverage the vast amount of available cybersecurity intelligence in efforts to provide more rapid malicious object (or event) detection, increased accuracy in cyber-attack detection, and increased visibility and predictability of cyber-attacks, their proliferation, and the extent of their infection.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
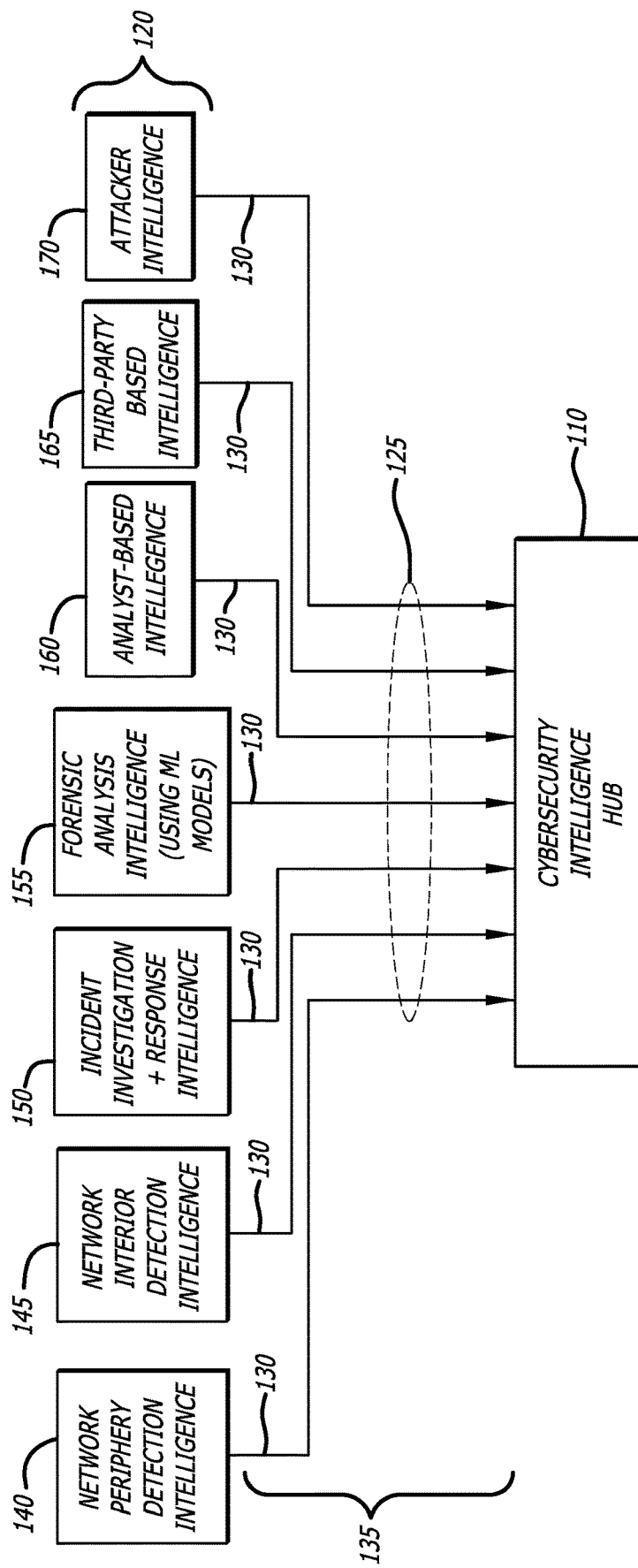
FIG. 1 is an exemplary block diagram of an exemplary embodiment of a comprehensive cybersecurity system.

Embodiments of the present disclosure generally relate to a comprehensive cybersecurity platform and method that, depending on the embodiment, parses, formats, stores, manages, updates, analyzes, retrieves, and/or distributes cybersecurity intelligence maintained within a global data store to enhance cyber-attack detection and response. The "cybersecurity intelligence" includes meta-information associated with an "artifact" (i.e., an object, an event, indicator of compromise, or other information that may be subjected to cybersecurity analyses), which may be received from a plurality of different network devices operating as cybersecurity intelligence sources. Each artifact may have been determined to be of a known classification (e.g., benign or malicious) or an unknown classification (e.g., not previously analyzed or analyzed with inconclusive results). This classification of an artifact is referred to as the "verdict".

Responsive to a request from a network device operating as a cybersecurity intelligence consumer, a portion of meta-information pertaining to a prior evaluated artifact corresponding to the monitored artifact (e.g., verdict) may be provided to the requesting cybersecurity intelligence consumer, thereby reducing analysis time and increasing analysis accuracy by that consumer. Furthermore, or in the alternative, portions of the meta-information may be used to generate additional meta-information that assists a cyber-attack analyst, cyber-attack incident investigator, or a security administrator (generally referred to as a "authorized agent") to better understand the nature, intent, scope and/or severity of a particular cyber-attack and/or malware associated with the cyber-attack, or even to verify whether a cyber-attack has occurred.

I. Detailed Overview

Embodiments of the present disclosure generally relate to a comprehensive cybersecurity platform featuring multiple (two or more) stages propagating cybersecurity intelligence between a cybersecurity intelligence hub located as a public or private cloud-based service and other cybersecurity sources and consumers. One example of the comprehensive cybersecurity platform includes a cybersecurity intelligence hub (first stage) that provides access to prior analysis results and verifies artifact classifications by one or more cybersecurity sensors. The cybersecurity intelligence hub is configured to monitor artifacts on a global scale (e.g., across a large enterprise or across customers of a vendor, or customers of multiple vendors, or persons accessing a government store), while reducing the overall network throughput requirements and mitigating repetitive analytics on identical artifacts. This allows for better platform scalability without adversely affecting the currency or relevancy of stored metadata within the cybersecurity intelligence hub.

More specifically, for this embodiment of the disclosure, as part of the comprehensive cybersecurity platform, the cybersecurity intelligence hub is communicatively coupled to a plurality of network devices. Each of the network devices corresponds to a cybersecurity intelligence source ("source") or a cybersecurity intelligence consumer ("consumer"), where certain network devices, such as a cybersecurity sensor for example, may be categorized as both a source and a consumer. Hence, the cybersecurity intelligence hub may operate as (i) a central facility connected via a network to receive meta-information from the sources; (ii) an intelligence analytics resource to analyze the received meta-information, including results from an analysis of meta-information or artifacts received from disparate sources, and store the analysis results with (or cross-referenced with) the received meta-information; and/or (iii) a central facility serving as a distribution hub connected via a network to distribute the stored meta-information to the consumers. In a centralized deployment, the cybersecurity intelligence hub may be deployed as a dedicated system or as part of cloud-based malware detection service (e.g., as part of, or complementary to and interacting with the cybersecurity detection system and service described in detail in U.S. patent application Ser. No. 15/283,126 entitled "System and Method For Managing Formation and Modification of a Cluster Within a Malware Detection System," filed Sep. 30, 2016; U.S. patent application Ser. No. 15/721,630 entitled "Multi-Level Control For Enhanced Resource and Object Evaluation Management of Malware Detection System," filed Sep. 29, 2017; and U.S. patent application Ser. No. 15/857,467 entitled "Method and System for Efficient Cybersecurity Analysis of Endpoint Events," filed Dec. 28, 2017, the entire contents of all of these applications are incorporated by reference herein).

As described below, the cybersecurity intelligence hub includes a global data store communicatively coupled to a data management and analytics engine (DMAE) and a management subsystem. The global data store operates as a database or repository to receive and store cybersecurity intelligence, which consolidates meta-information associated with a plurality of artifacts for storage therein. Each artifact of the plurality of artifacts has been (i) previously analyzed for malware and determined to be of a malicious or benign classification, (ii) previously analyzed for malware without conclusive results and determined to be of an "unknown" verdict, or (iii) previously not analyzed (or awaiting analysis), and thus of an "unknown" verdict. In general terms, the global data store contains the entire stockpile of cybersecurity intelligence collected and used by individuals, businesses, and/or government agencies (collectively, "customers"), which is continuously updated (through a process akin to "crowd sourcing") by the various intelligence sources and by the DMAE to maintain its currency and relevancy. The global data store may be implemented across customers of a particular product and/or service vendor or across customers of many such vendors.

Herein, the stored cybersecurity intelligence within the global data store includes meta-information associated with analyzed or unanalyzed artifacts, which are gathered from a variety of disparate cybersecurity sources. One cybersecurity source includes cybersecurity sensors located at a periphery of a network (or subnetwork) and perhaps throughout the network. A "cybersecurity sensor" corresponds to a physical network device or a virtual network device (software) that assists in the detection of cyber-attacks or attempted cyber-attacks and provides alert messages in response to such detection. A cybersecurity sensor may feature malware detection capabilities such as, for example, static malware analysis (e.g., anti-virus or anti-spam scanning, pattern matching, heuristics, and exploit or vulnerability signature matching), run-time behavioral malware analysis, and/or event-based inspection using machine-learning models. Another cybersecurity source provides, via a network device, cybersecurity intelligence utilized by highly trained experts such as cybersecurity analysts, forensic analysts, or cyber-incident response investigators. Also, another cybersecurity source provides cybersecurity intelligence from a cybersecurity vendor, academic, industry or governmental report.

In general, the cybersecurity intelligence hub maintains meta-information associated with actual or potential cyber-attacks, and more specifically with artifacts constituting actual or potential malware that are encountered (and, depending on the embodiment, already analyzed or not) by the cybersecurity intelligence sources. Additionally, the meta-information may include information associated with artifacts classified as benign, in lieu of only malicious artifacts, in order to provide a more comprehensive view of the cybersecurity threat landscape experienced by customers of the comprehensive cybersecurity platform described below. The cybersecurity intelligence may be consumed by many of these same sources and possibly other network devices, e.g., subscribing customers, including governmental, regulatory or enforcement based agencies that provide no cybersecurity intelligence sourcing. These sources and consumers constitute a cybersecurity community built around the cybersecurity intelligence hub.

As described in detail below, the global data store is an intrinsic part of the operation and effectiveness of the cybersecurity intelligence hub. For instance, according to one embodiment of the disclosure, a customer-deployed, cybersecurity sensor (e.g., a malware detection appliance being a general purpose computer performing cybersecurity analyses or a dedicated cybersecurity device, a software agent or other security software executing on a network device, etc.) receives meta-information (and possibly the artifact) for verdict verification. Based on the meta-information, the sensor determines whether the artifact has been previously analyzed and a verdict for that artifact is available. This determination may be performed by either (i)

extracting "distinctive" metadata from the meta-information that differentiates the artifact (e.g., events, objects, etc.) from other artifacts or (ii) generating the distinctive metadata from the artifact itself. For some artifacts (e.g., objects), the distinctive metadata may include an identifier (e.g., object ID). The object ID may be a hash of the object (e.g., hash value), a checksum, or other representation based on content forming the object or information identifying the object such as a filename, or a Uniform Resource Locator (URL). For other artifacts (e.g., network connection events), a grouping of Internet Protocol (IP) addresses and/or ports may operate as the distinctive metadata.

Thereafter, the logic within the sensor accesses meta-information within a data store (on-board the sensor or accessible and preferably local to the sensor) and compares this meta-information to the distinctive metadata (e.g., object ID for an object being the artifact). Based on the results of this comparison, if a match is detected, the logic within the sensor concludes that the artifact has been previously provided to the cybersecurity intelligence hub. Hence, in some embodiments, the sensor refrains from uploading the meta-information to the cybersecurity intelligence hub. However, if a match is not detected, the logic within the sensor considers the artifact has not been previously analyzed, stores the meta-information, and provides the meta-information to the cybersecurity intelligence hub. The cybersecurity intelligence hub receives the meta-information from the sensor, including the distinctive metadata (e.g., object ID), and determines whether the global data store includes one or more entries for that artifact in order to return a "consolidated" verdict to the sensor.

As an example, when the artifact is an object or a process behavior or other event related to an identified object (described below), the distinctive metadata includes a hash value of the object (object ID), which may operate as a search index for stored meta-information within the global data store. The logic within the DMAE of the cybersecurity intelligence hub attempts to determine whether the object ID matches (e.g., is identical or has a prescribed level of correlation with) a stored object ID. For this example, a "match" is determined when the object ID is found to be part of stored meta-information associated with a previously analyzed object (generally referred to as "prior evaluated" artifact). Given the cybersecurity intelligence hub supports multiple sensors, it is contemplated that meta-information for the same detected artifact (e.g., object) from different sensors may reside within the global data store (referred to as the "consolidated meta-information" associated with the object). The verdicts (e.g., malicious, benign, unknown) associated with the stored, consolidated meta-information for the object may be returned from the global store to the analytics logic. Depending on the rules for generating the consolidated verdict that control its operability, the analytics logic may determine the consolidated verdict for the artifact as a known (malicious, benign) classification or an unknown classification. In fact, in some embodiments, the consolidated verdict may remain at an "unknown" status until a predetermined number of analyses of the artifact (e.g., the number of analyses exceeding a verdict count threshold, as described below) share the same verdict.

The cybersecurity sensor may be configured to operate pursuant to a variety of different workflows based on the received consolidated verdict. In response to receiving a "malicious" consolidated verdict for an artifact (based upon consolidated meta-information associated with a prior evaluated artifact), the cybersecurity sensor may issue or initiate an alert message (alert) to a security administrator, which includes information that enables an action to be undertaken by the security administrator and/or causes further analysis of the artifact to be initiated. This further analysis may include acquiring additional meta-information regarding the artifact including its characteristics and/or behaviors and its present context (e.g., state information, software profile, timestamp, etc.) to be subsequently uploaded into the global data store. Herein, an "alert" may be a system-initiated notification on a particular cybersecurity matter (sent, for example, via email or text message) while a "report" may be an alert or a system-initiated or recipient-initiated download that can provide greater detail than an alert on a cybersecurity matter.

For a "benign" consolidated verdict, the cybersecurity sensor may terminate further analysis for the artifact. For an "unknown" consolidated verdict, the cybersecurity sensor may initiate further analyses as described below, where the unknown verdict is due to a lack of either (i) an entry in the global data store matching to the artifact or (ii) an entry indicating the artifact has been analyzed previously but with inconclusive results (e.g., not having satisfied benign or maliciousness thresholds, or (iii) the verdict count threshold corresponding to a prescribed number of verdicts needed from different analyses has not been exceeded).

The cybersecurity intelligence hub can also be queried at any point of time by the sensor (or by a customer via a portal) to check for additional or updated meta-information. The meta-information may involve a verdict of a prior evaluated artifact, updated information based on newly obtained meta-information from recent analysis results, information to assist in remediation of malware, and/or information regarding the current cybersecurity threat landscape.

It is contemplated that, where the artifact is a URL for example, the cybersecurity intelligence hub may contain meta-information stored within the global data store identifying the server associated with the URL, including whether that server is considered, by one or more prior verdicts associated with other communications, to have a high probability of being a malicious server. In response, based on this server-based meta-information, the cybersecurity intelligence hub may associate a high weighting or score with the artifact in classifying the artifact as malicious.

The cybersecurity sensor may also communicate results of its initiated analysis to the global data store, where the analysis results are added to an entry (or entries) associated with the artifact being analyzed and becoming part of the consolidated meta-information for that artifact. It is anticipated that the sources will be regularly updating the global data store with new results, thus maintaining the currency and relevancy of its recorded cybersecurity information as further information concerning previously identified cyber-attacks is uncovered, new cyber-attacks are identified, and, generally, additional artifacts are encountered and possibly analyzed and determined to be of benign, malicious or unknown classification. Of considerable benefit, contextual information included as part of the stored meta-information from prior verdicts can be used to assess the nature, vector, severity, and scope of a potential cyber-attack. Since the global data store maintains and provides analysis results from potentially disparate sources (sometimes cross-customer, cross-industry, or cross-vector), the cybersecurity intelligence maintained within the global data store can be used to generate a comprehensive view of a cyber-attack, even for attacks involving sophisticated (e.g., multi-vector or multi-phased) malware and cyber-attack campaigns that may be missed by "single point" malware detection systems.

In accordance with one embodiment of the disclosure, the DMAE of the cybersecurity intelligence hub further includes analytics logic and data management logic. The data management logic may be configured to manage organization such as normalizing data into a selected data structure or format, updating index mapping tables, and/or removing certain data (e.g., parameters such as personal identification information, entered passwords, etc.) that is not required for cybersecurity analysis. Additionally, the data management logic may be configured to perform retrieval (read) and storage (write) of the cybersecurity intelligence within the global data store. The analytics logic may be configured to receive request messages for information from any cybersecurity sensor or other consumers of the cybersecurity intelligence, including security analysts or administrators for example. One type of request message is a request for cybersecurity intelligence (e.g., verdict) pertaining to an artifact while another type of request message is a query for stored analysis results for a particular customer.

According to one embodiment of the disclosure with a modular architecture, the analytics logic is communicatively coupled to a plurality of software modules (e.g., plug-ins) installed within the DMAE to handle request messages and perform specialized analytics. Herein, for this embodiment, the analytics logic parses the request message to extract at least a portion of the meta-information (e.g., distinctive metadata), invokes (selects and/or activates) one or more plug-ins, provides the extracted portion of the meta-information to the one or more selected plug-ins, receives analysis results from the one or more plug-ins, and, in some cases, processes those results to determine the consolidated verdict in accordance with rules for generating the consolidated verdict that control its operability (referred to as "consolidated verdict determination rules").

The consolidated verdict determination rules may be static or configurable via download or a user portal. According to one embodiment of the disclosure, the analytics logic is configured to invoke and activate one or more plug-ins for processing, where the plugins may be activated concurrently (in a time-overlapping fashion) or sequentially, and the determination of which one or more plug-ins to activate and their order in which they are activated may be determined prior to invoking any of the one or more plug-ins or may be determined dynamically later during or after analysis by one or more plug-ins. For example, the analytics logic may be configured to activate one or more plug-ins for processing of a request message (request or query) in accordance with a prescribed order, based on a request type and/or meta-information results of a prior analysis by a plug-in. More specifically, one selection process may involve the analytics logic selecting an available plug-in, and after completion of such operations, invoking another plug-in to render a consolidated verdict. In some embodiments, the selection of a "next" plug-in may be in accordance with analysis ordering rules, or conditional rules (e.g., an "if this, then that" rule as applied to the type of object or a prior analysis result), which may be user configurable and/or stored with the consolidated verdict determination rules.

According to another embodiment of the disclosure, the analytics logic may be configured to also analyze the received, consolidated meta-information in accordance with the consolidated verdict determination rules. Some of these rules may be coded to preclude the return of a requested verdict unless a prescribed number of analysis results conclude the same, consistent verdict from the same source or from different sources.

As described herein, the plurality of plug-ins may include different sets (one or more) of plug-ins that handle different categories of request messages. For instance, a first set of plug-ins may handle low-latency (real-time) request messages requiring a response message to be returned promptly (e.g., within a prescribed duration after receipt of the request message and/or during the same communication session). A second set of plug-ins may handle queries for stored consolidated meta-information for a particular network device or customer, which allow for greater latency (e.g., minutes) in handling and, for at least some of these plug-ins, the consolidated meta-information may be returned during a different (subsequent) communication session. A third set of plug-ins may handle the generation of additional cybersecurity intelligence and are invoked in response to a triggering event, namely a dynamic event (e.g., analysis results received from another plug-in for continued analysis) or a scheduled event (e.g., whereupon a plug-in operates as a foreground or background process on a periodic or aperiodic schedule). For example, the scheduled activation may occur as a timeout condition when a prescribed period of time has elapsed since the last activation of a plug-in, a max count condition where a prescribed number of monitored events have occurred such as a prescribed number of request messages have been made, a number of entry accesses have been performed, etc. since the last activation of a plug-in.

Hence, the plurality of plug-ins may include some or all of the following: (1) plug-in(s) to generate responses to request messages, sent by the cybersecurity sensors and other consumers where artifacts are found benign or malicious consistently in other prior analysis verdicts; (2) plug-in(s) to generate models and training of such models to handle low-latency request messages; (3) plug-in(s) to generate responses to signal a user of an "unknown" verdict and include information for certain operations to assist in the analysis and classification of the artifact; (4) plug-in(s) to identify inconsistent verdicts, prompt determination to confirm accuracy of (verify) prior analyses results and notify an administrator (or customer) of incorrect verdicts previously provided and changes in such verdicts; and/or (5) plug-in(s) to identify short or long term trends or targeted and deliberate cyber-attack campaigns by analysis of the cybersecurity threat landscape.

According to another embodiment of the cybersecurity intelligence hub, the data management logic is communicatively coupled to the second set of plug-ins and invokes one or more plug-ins of the second set of plug-ins to handle other request messages directed to higher-latency (generally non-real time) analyses upon receipt of the request message (or meta-information associated with the request message) by the analytics logic for processing. Herein, the data management logic is configured to select the particular plug-in(s) to handle a request for and return of results from the request message where timeliness of the response is of less importance. The results may be temporarily stored and provided to the requesting cybersecurity sensor. The data management logic still manages the organization, retrieval and storage of the cybersecurity intelligence within the global data store.

In summary, as an illustrative embodiment, the cybersecurity intelligence hub may receive a request message over a network from a cybersecurity sensor. Responsive to the request message being directed to a low-latency analysis (e.g., requesting a prior verdict associated with a particular artifact encountered by the sensor), the analytics logic invokes one or more plug-ins (referred to as "plug-in(s)") from the first set of plug-ins. The selected plug-in(s) signal the data management logic to check the global data store for one or more entries including stored meta-information pertaining to a prior evaluated artifact that matches particular distinctive metadata associated with the particular artifact (e.g., comparison of object IDs such as hash values, checksums or any collection of data to specifically identify the object, etc.). Upon locating at least one entry, the data management logic retrieves the consolidated meta-information from that entry or entries (e.g., verdicts and other meta-information such as software profile operating during runtime when the artifact was detected or timestamp associated with the detection of the artifact) and provides the retrieved consolidated meta-information to the analytics logic. Thereafter, according to one embodiment of the disclosure, the analytics logic returns at least the consolidated verdict (and perhaps other portions of the consolidated meta-information) to the requesting sensor. All the while, the analytics logic tracks the request message (message ID) and the requesting sensor (sensor ID) and causes the communication session established through a network interface of the cybersecurity intelligence hub to remain open in servicing this low-latency request.

According to another embodiment of the disclosure, operating with the DMAE, the management subsystem of the cybersecurity intelligence hub may be communicatively coupled to the third set of plug-ins, which are configured to generate additional cybersecurity intelligence based on analyses of stored cybersecurity intelligence within the global data store. Herein, the third set of plug-ins may be invoked by the analytics logic in response to a triggering event, as described above. In response to a triggering event, the management subsystem may also invoke one or more plug-ins of the third set of plug-ins to analyze a portion of the stored cybersecurity intelligence and generate additional cybersecurity intelligence to provide more context information in assessing future cyber-attacks. For example, a retroactive re-classification plug-in may be installed as one of these plug-ins to monitor, confirm and perform system-wide correction of prior false positive (FP) and/or false negative (FN) results, as described below.

It is contemplated that other inventive aspect, directed to the sharing and exchange of meta-information directed to malicious and benign artifacts may result in the formulation of heuristic rules and/or signatures as well as future guidance as to incident investigations and heightened threat protections is described below.

II. Terminology

In the following description, certain terminology is used to describe aspects of the invention. In certain situations, each of the terms "logic," "system," "component," or "engine" is representative of hardware, firmware, and/or software that is configured to perform one or more functions. As hardware, the logic (or system/component/engine) may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic (or system/component/engine) may be software in the form of one or more software modules. The software modules may include an executable application, a daemon application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

A "network device" generally refers to either a physical electronic device featuring data processing and/or network connection functionality or a virtual electronic device being software that virtualizes at least a portion of functionality of the physical network device. Examples of a network device may include, but are not limited or restricted to, a server, a mobile phone, a computer, a set-top box, a standalone malware detection appliance, a network adapter, or an intermediary communication device (e.g., router, firewall, etc.), a virtual machine, or any other virtualized resource.

The term "consolidated verdict" generally refers to a selected verdict for an artifact that normally coincides with at least one verdict of a plurality of verdicts pertaining to the artifact that may have been received from multiple sources. One exception may be when the consolidated verdict is set to an "unknown" classification.

The term "meta-information" generally refers to a collection of information associated with an artifact. One type of meta-information is referred to as "consolidated meta-information," including the collection of stored information pertaining to an artifact that may originate from a single source or different sources. The consolidated meta-information may include, but is not limited or restricted to any or all of the following: (a) a portion of the distinctive metadata of the artifact (e.g., hash value, checksum, or other ID for an object), (b) one or more verdicts of the artifact, (c) a consolidated verdict, (d) information directed to the source of the artifact (e.g., source identifier, descriptor, serial number, type and/or model data, filename, version number, etc.) from which the artifact was first received and, where applicable, information from each subsequent source providing meta-information on the same artifact, (e) a timestamp associated with each verdict, and/or (f) other contextual information related to prior analyses and verdicts. Another type of meta-information may include uploaded meta-information provided to the cybersecurity intelligence hub from a cybersecurity sensor. This uploaded meta-information may include the portion of the distinctive metadata, source information (e.g., customer identifier, device identifier, etc.), information associated with an operating environment of the sensor or endpoint from which the artifact may have originated, and/or the timestamp.

The term "event" generally refers to a task or activity that is conducted by a software component running on the endpoint (virtual or real) and, in some situations, the activity may be undesired or unexpected indicating a potential cyber-attack is being attempted, such as a file being written to disk, a process being executed, or an attempted network connection. The event is monitored and logged for analysis, correlation and classification. A virtual endpoint includes a run-time environment that mimics, in some ways, that of a real endpoint, and is established within a virtual machine used to safely monitor one or more runtime activities for purposes of analysis for malware. Virtual endpoints are used, for example, by a cybersecurity appliance, located, for example, at a periphery of a network or operatively associated with an email server, to monitor network traffic and emails, respectively, for a cyber-attack. As an illustrative example, an event related to a particular activity performed by a process (e.g., process event) may be represented by distinctive metadata (described below), which may include a path identifying a location of an object being referenced by the process and an identifier of the object (e.g., hash value or checksum of the object). Likewise, an event related to an attempted or successful network connection may be represented by a destination (IP) address (DEST_IP), a source (IP) address (SRC_IP); and a destination port (DEST_PORT) associated with the network connection.

The term "object" generally refers to content having a logical structure or organization that enables it to be classified for purposes of analysis for malware. The content may include an executable (e.g., an application, program, code segment, a script, dynamic link library "dll" or any file in a format that can be directly executed by a computer such as a file with an ".exe" extension, etc.), a non-executable (e.g., a storage file; any document such as a Portable Document Format "PDF" document; a word processing document such as Word® document; an electronic mail "email" message, web page, etc.), or simply a collection of related data. According to one embodiment of the disclosure, the collection of related data may be data corresponding to a particular activity (event), such as a successful or unsuccessful logon or a successful or unsuccessful network connection attempt.

The term "message" generally refers to signaling (wired or wireless) as either information placed in a prescribed format and transmitted in accordance with a suitable delivery protocol or information made accessible through a logical data structure such as an API. Examples of the delivery protocol include, but are not limited or restricted to HTTP (Hypertext Transfer Protocol); HTTPS (HTTP Secure); Simple Mail Transfer Protocol (SMTP); File Transfer Protocol (FTP); iMESSAGE; Instant Message Access Protocol (IMAP); or the like. Hence, each message may be in the form of one or more packets, frames, or any other series of bits having the prescribed, structured format.

As described above, one type of message may be a request to retrieve stored, consolidated meta-information that may influence subsequent handling of an artifact under analysis. Another message type may include a query for stored, consolidated meta-information for a particular customer. Herein, the stored, consolidated meta-information includes a verdict that identifies a classification (e.g., benign, malicious, or unknown) of a prior evaluated artifact, a severity of the cyber-attack if the verdict is malicious, a textual recommendation to remediate the detected malware, etc.

As described above, each cybersecurity sensor may be deployed as a "physical" or "virtual" network device, as described above. Examples of a "cybersecurity sensor" may include, but are not limited or restricted to the following: (i) a cybersecurity appliance that monitors incoming and/or outgoing network traffic, emails, etc.; (ii) a firewall; (iii) a data transfer device (e.g., intermediary communication device, router, repeater, firewalls, portable mobile hotspot, etc.); (iv) a security information and event management system ("SIEM") for aggregating information from a plurality of network devices, including without limitation endpoint devices; (v) an endpoint; (vi) a virtual device being software that supports data capture, preliminary analysis of data for malware, and meta-information extraction, including an anti-virus application or malware detection agent; or (v) exchange or web server equipped with malware detection software; or the like.

An "endpoint" generally refers to a physical or virtual network device equipped with a software image (e.g., operating system (OS), one or more applications), and a software agent to capture processing events (e.g. tasks or activities) in real-time for cybersecurity investigation or malware detection. Embodiments of an endpoint include, but are not limited or restricted to a laptop, a tablet, a netbook, a server, an industry or other controller, a set-top box, a device-installed mobile software and/or a management console. An illustrative embodiment of an endpoint is shown in FIG. 3C and described below.

A "plug-in" generally refers to a software component designed to add a specific functionality or capability to logic. The plug-in may be configured to communicate with the logic through an application program interface (API). The component can be readily customized or updated without modifying the logic. As used herein, the plug-in may encompass an add-on or extension, and may include implementations using shared libraries that can be dynamically loaded at run-time.

The term "computerized" generally represents that any corresponding operations are conducted by hardware in combination with software and/or firmware.

As briefly described above, the term "malware" may be broadly construed as malicious software that can cause a malicious communication or activity that initiates or furthers an attack (hereinafter, "cyber-attack"). Malware may prompt or cause unauthorized, unexpected, anomalous, unintended and/or unwanted behaviors (generally "attack-oriented behaviors") or operations constituting a security compromise of information infrastructure. For instance, malware may correspond to a type of malicious computer code that, upon execution and as an illustrative example, takes advantage of a vulnerability in a network, network device or software, for example, to gain unauthorized access, harm or co-opt operation of a network device or misappropriate, modify or delete data. Alternatively, as another illustrative example, malware may correspond to information (e.g., executable code, script(s), data, command(s), etc.) that is designed to cause a network device to experience attack-oriented behaviors. The attack-oriented behaviors may include a communication-based anomaly or an execution-based anomaly, which, for example, could (1) alter the functionality of a network device in an atypical and unauthorized manner; and/or (2) provide unwanted functionality which may be generally acceptable in another context.

In certain instances, the terms "compare," "comparing," "comparison," or other tenses thereof generally mean determining if a match (e.g., identical or a prescribed level of correlation) is achieved between two items where one of the items may include content within meta-information associated with the artifact.

The term "transmission medium" generally refers to a physical or logical communication link (or path) between two or more network devices. For instance, as a physical communication path, wired and/or wireless interconnects in the form of electrical wiring, optical fiber, cable, bus trace, or a wireless channel using infrared, radio frequency (RF), may be used.

Finally, the terms "or" and "and/or" as used herein are to be interpreted as inclusive or meaning any one or any combination. As an example, "A, B or C" or "A, B and/or C" mean "any of the following: A; B; C; A and B; A and C;

B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. Comprehensive Cybersecurity Platform

Referring to FIG. 1, a block diagram of an exemplary embodiment of a comprehensive cybersecurity platform (CCP) 100 is shown. Herein, the CCP 100 features a cybersecurity intelligence hub 110 and a plurality of cybersecurity intelligence sources ("sources") 120. The cybersecurity intelligence hub 110 is configured to receive, parse, analyze and store, in a structured format within a global data store, cybersecurity intelligence from the sources 120. The cybersecurity intelligence may include meta-information associated with artifacts that have undergone prior malware analyses by cybersecurity sensors, incident responders or highly trained cybersecurity experts, as described above. These artifacts are referred to as "prior evaluated artifacts." However, it is contemplated that the cybersecurity intelligence may include meta-information associated with detected artifacts that have not undergone prior malware analyses. The cybersecurity intelligence hub 110 is further configured to verify a "verdict" (e.g., a benign, malicious, or unknown classification) for an artifact based on analyses of one or more prior evaluated artifacts that match the artifact. Also, the cybersecurity intelligence hub 110 is configured to evaluate and/or generate additional cybersecurity intelligence for use in detecting campaigns, identifying trends, and/or retroactively modifying prior verdicts provided to consumers and later determined to be incorrect.

Herein, some or all of the cybersecurity intelligence hub 110 may be located at an enterprise's premises (e.g., located as any part of the enterprise's network infrastructure whether located at a single facility utilized by the enterprise or at a plurality of facilities). As an alternative embodiment, some or all of the cybersecurity intelligence hub 110 may be located outside the enterprise's network infrastructure and provided as a service over a public or private cloud-based services that may be hosted by a cybersecurity provider or another entity separate from the enterprise (service customer). For example, one of these embodiments may be a "hybrid" deployment, where the cybersecurity intelligence hub 110 may include some logic partially located on premises and other logic located as part of a cloud-based service. This separation allows for sensitive cybersecurity intelligence (e.g., proprietary intelligence learned from subscribing customers, etc.) to remain on premises for compliance with any privacy and regulatory requirements.

As further shown in FIG. 1, the cybersecurity intelligence sources 120 may supply cybersecurity intelligence 125 from various locations over transmission medium 130 forming a wired or wireless network 135. Delivered by the cybersecurity intelligence sources 120 using a push and/or pull communication schemes, the cybersecurity intelligence 125 may include, but is not limited or restricted to one or more of the following: (a) network periphery detection intelligence 140, (b) network interior detection intelligence 145, (c) incident investigation/response intelligence 150, (d) forensic analysis intelligence 155 using machine-learning models, (e) analyst-based intelligence 160, (f) third-party based intelligence 165, and/or (g) attacker intelligence 170.

More specifically, the cybersecurity intelligence 125 corresponds to malware analytics or information collected for such malware analytics. For instance, the network periphery detection intelligence 140 includes cybersecurity intelligence gathered from analyses of artifacts by an appliance, a firewall or other network devices that are monitoring network traffic to detect malicious intrusions into a protected network. The intelligence 140 may include URLs (email information), analyzed artifacts and/or meta-information associated with the analyzed artifacts. The network interior detection intelligence 145 includes cybersecurity intelligence gathered from analyses of artifacts by network devices connected within the network after passing the periphery (e.g., software agents within endpoints, email servers, etc.) in order to detect and gather meta-information associated with malicious operations occurring on devices within the network itself.

The incident investigation/response intelligence 150 includes cybersecurity intelligence gathered by cyber-attack incident investigators during analyses of successful attacks. This type of cybersecurity intelligence is useful for identifying the nature and source of a cyber-attack, how the identified malware gained entry on the network and/or into a particular network device connected to the network, history of the lateral spread of the malware during the cyber-attack, any remediation attempts conducted and the result of any attempts, and/or procedures to detect malware and prevent future attacks. Likewise, the forensic analysis intelligence 155 includes cybersecurity intelligence gathered by forensic analysts or machine-learning driven forensic engines, which is used to formulate models for use by certain types of cybersecurity sensors (e.g., appliances) in classifying an artifact as malicious or benign.

As further shown in FIG. 1, the analyst-based intelligence 160 includes cybersecurity intelligence gathered by highly-trained cybersecurity analysts, who analyze the detected malware to produce meta-information directed to its structure and code characteristics. The third-party based intelligence 165 includes cybersecurity intelligence gathered from reporting agencies and other cybersecurity providers, which may be company, industry or government centric. Lastly, the attacker intelligence 170 includes cybersecurity intelligence gathered on known parties that initiate cyber-attacks. Such cybersecurity intelligence may be directed to who are the attackers (e.g., name, location, etc.), whether state-sponsored attackers as well as common tools, technique and procedures used by a particular attacker that provide a better understanding typical intent of the cyber-attacker (e.g., product disruption, financial information exfiltration, etc.), and the general severity of cyber-attacks initiated by a particular attacker.

Collectively, some or all of these types of cybersecurity intelligence may be stored and organized within the cybersecurity intelligence hub 110 on an artifact basis, device basis, customer basis, or the like.

IV. Cybersecurity Intelligence Hub

Figure 2A:
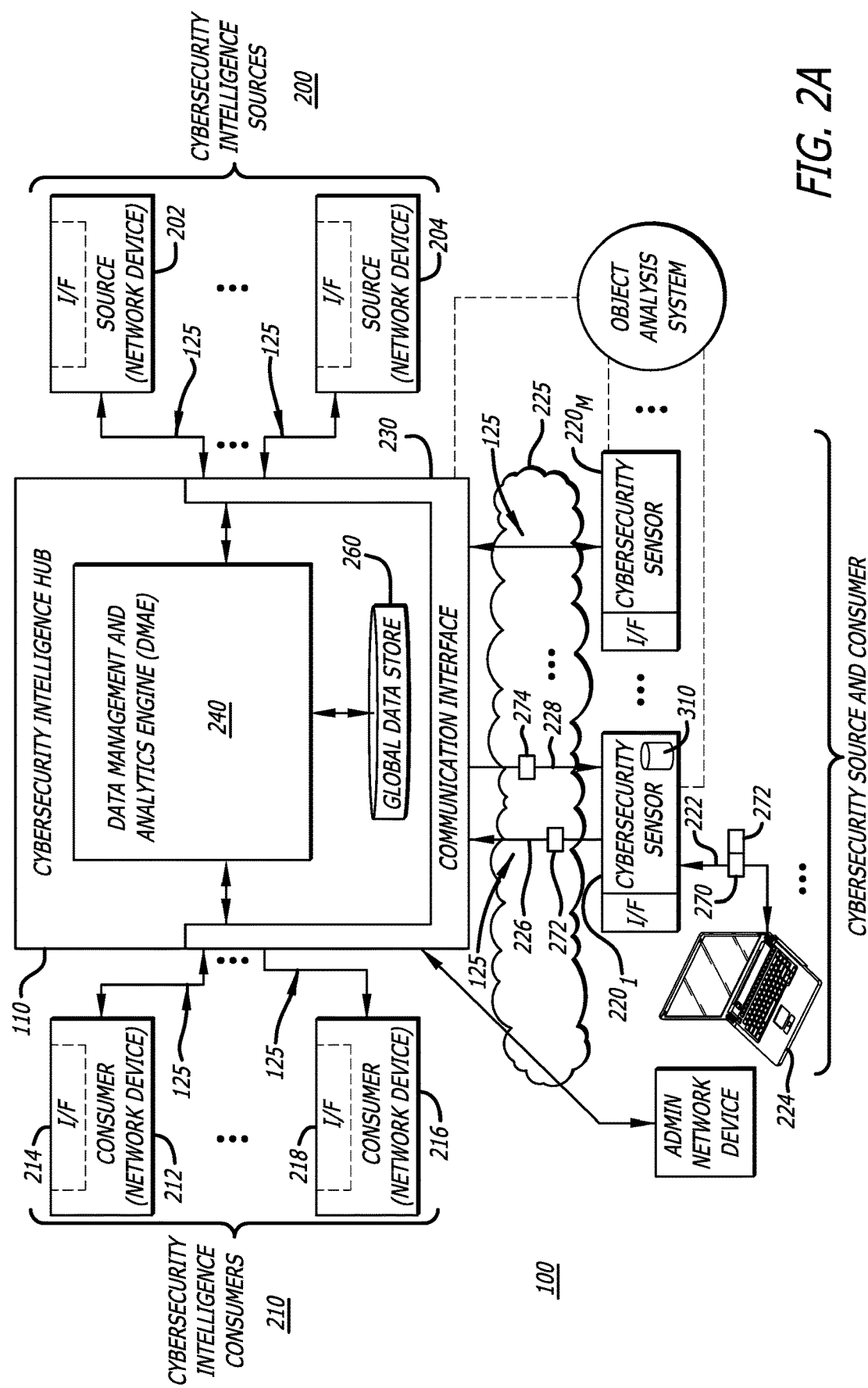
FIG. 2A is an exemplary embodiment of the cybersecurity intelligence hub of FIG. 1 communicatively coupled to sources and consumers of cybersecurity intelligence.

Referring now to FIG. 2A, an exemplary embodiment of the cybersecurity intelligence hub 110 of FIG. 1 is shown. The cybersecurity intelligence hub 110 is communicatively coupled to cybersecurity sources 200 and cybersecurity consumers 210 to receive cybersecurity intelligence therefrom. Depending on its operating state, each cybersecurity sensor $220_1$-$220_M$ may operate as a source 200 or as a consumer 210 of the cybersecurity intelligence. The cybersecurity intelligence hub 110 includes a communication interface 230, a data management and analytics engine (DMAE) 240, administrative interface logic (portal) 245, customer interface logic (portal) 246, a management subsystem 250, and/or a global data store 260, as collectively illustrated in FIGS. 2A-2C.

A. Hub-Consumer/Source Connectivity

Figure 2B:
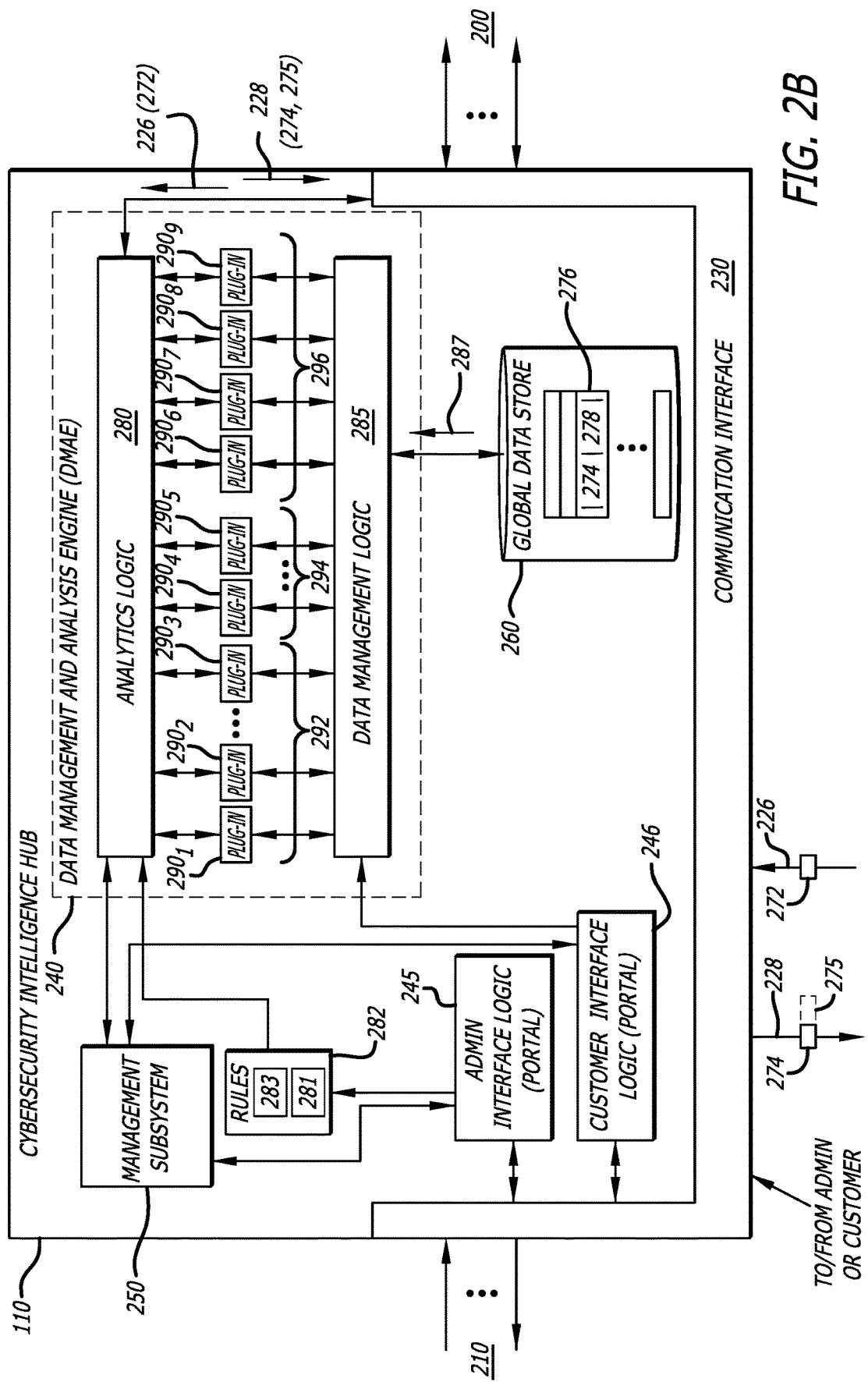
FIG. 2B is a first exemplary embodiment of the cybersecurity intelligence hub of FIG. 1.

Referring to FIGS. 2A-2B, each of the sources 200 is configured to provide a portion of cybersecurity intelligence 125 to the cybersecurity intelligence hub 110 via the communication interface 230, where the portion of cybersecurity intelligence 125 is parsed by the DMAE 240 and placed into a structured format within the global data store 260 of the cybersecurity intelligence hub 110. The structured format of the cybersecurity intelligence 125 supports one or more indexing schemes organized by data type, artifact type (e.g., hash value of object), source type (e.g., original source or cybersecurity source), subscriber type (e.g., company, industry), geographic location (e.g., source IP address), the number of occurrence, or the like.

Each consumer 210 is configured to receive the cybersecurity intelligence 125 from the cybersecurity intelligence hub 110 via the communication interface 230. As shown, a first portion of the cybersecurity intelligence 125 may be returned in response to a request message provided from a first cybersecurity consumer (network device) 212 and observable via an user interface 214 (e.g., display screen, separate device with display capability, etc.) while a second portion of the cybersecurity intelligence 125 may be provided to a second cybersecurity consumer 216 and observable via the user interface 218 in response to a triggered event detected by the management subsystem 250 (e.g., scheduled time or a prescribed period of time has elapsed based on received time data from a clock source such as a real-time clock, a particular number of requests for analysis of meta-information associated with a particular artifact as maintained by a counter associated with each entry in the global data store 260, etc.). Herein, the second cybersecurity consumer 216 may be a server configured to support cybersecurity intelligence downloads with no capability to upload additional cybersecurity intelligence into the cybersecurity intelligence hub 110 (e.g., governmental entity, etc.) while the first cybersecurity consumer 212 may be configured as a server that operates as both a source and consumer.

B. Hub-Sensor Connectivity

1. First Embodiment

As shown in FIG. 2A, each cybersecurity sensor $220_1$-$220_M$ (M≥1), such as the cybersecurity sensor $220_1$ for example, is configured to communicate with the cybersecurity intelligence hub 110 in response to receiving, for analysis, a submission 222 (e.g., meta-information 272 and/or artifact 270) from a network device 224. More specifically, according to one embodiment of the disclosure, where the artifact 270 is provided from the network device 224, the cybersecurity sensor $220_1$ may conduct a static malware analysis of the artifact 270 to determine whether the artifact 270 is suspicious. In the alternative, or additionally performed serially or in parallel with the static malware analysis operations, the cybersecurity sensor $220_1$ may perform an analysis by accessing metadata within a data store 310 of the cybersecurity sensor $220_1$ and compare this metadata to certain metadata within the meta-information 272 that differentiate the artifact 270 from other artifacts (referred to as "distinctive metadata"). For example, this distinctive metadata may include an identifier (e.g., object ID) when the artifact associated with certain types of process events (e.g., open file, create file, write file, etc.) or an object itself. As another example, the distinctive metadata may consist of a source IP address, a destination IP address, and destination port when the artifact is an attempted network connection event.

Upon determining none of the contents within the data store 310 matches the distinctive metadata within the meta-information 272 (e.g., object ID), the cybersecurity sensor $220_1$ sends a request message 226, including the meta-information 272 to the DMAE 240 of the cybersecurity intelligence hub 110. One type of request message 226 may be directed to determining whether the artifact 270 has been previously evaluated by prompting the DMAE 240 to compare the artifact ID, which may be represented as a hash value or checksum of the distinctive metadata (e.g., Object ID, address/port combination, etc.) to stored metadata of prior evaluated artifacts. If a match occurs, the cybersecurity intelligence hub 110 returns a response message 228, including a consolidated verdict 274 (classification) for the matched, prior evaluated artifact and additional meta-information associated with the consolidated verdict 274.

Responsive to receiving a "malicious" consolidated verdict for the artifact 270 from the DMAE 240, included as part of the consolidated meta-information associated with the matched prior evaluated artifact, the cybersecurity sensor $220_1$ may (a) generate an alert a security administrator (of a network to which the network device 224 belongs) that the artifact 270 was previously determined to be malicious (e.g., in most cases, providing a portion of the consolidated meta-information as context) to enable action to be taken to remediate, interdict or neutralize the malware and/or halt its spread (e.g., within an enterprise network to which the network device 224 connects), and/or (b) initiate further analysis of the artifact 270 to acquire additional meta-information including its characteristics and/or behaviors and its present context (e.g., state information, software profile, timestamp, etc.) to subsequently upload into the global data store 260.

In response to receiving a "benign" consolidated verdict, the cybersecurity sensor $220_1$ may terminate further analysis of the artifact. In response to receiving an "unknown" consolidated verdict, however, the cybersecurity sensor $220_1$ may determine to initiate further analysis as described above, where the unknown consolidated verdict indicates no entry in the global data store 260 is present for the artifact or the entry indicates the artifact has been analyzed previously but with inconclusive results (e.g., not having satisfied benign or maliciousness thresholds, or the verdict count threshold has not been exceeded). Accordingly, based on the consolidated verdict, redundant analyses of the artifact may be avoided.

As an illustrative example, upon receiving the artifact 270 from the network device 224, the cybersecurity sensor $220_1$ conducts a static malware analysis of the artifact 270 to determine whether the artifact is suspicious. Furthermore, operating in parallel with the static malware analysis, the cybersecurity sensor $220_1$ performs an analysis by accessing metadata within a data store 310 of the cybersecurity sensor $220_1$ and comparing the metadata to the distinctive metadata within the meta-information 272 (e.g., object ID). Based on this comparison, the cybersecurity sensor $220_1$ can determine whether the artifact 270 has been previously analyzed by the cybersecurity intelligence hub 110 via the cybersecurity sensor $220_1$. Upon confirming the artifact 270 has not been previously analyzed by the cybersecurity intelligence hub 110, at least the meta-information 272 is included as part of the request message 226 provided to the cybersecurity intelligence hub 110.

As described above, the global data store 260 is accessed via the cybersecurity sensor $220_1$. Additionally, the global data store 260 may be accessed by a platform administrator via an administrative portal 245 or by a consumer 210 (e.g. a customer) directly or via a customer portal 246 of FIG. 2B, permitting and controlling external access to the cybersecurity intelligence hub 110. In particular, the administrative portal 245 may be used to configure rules (e.g., modify, delete, add rules such as consolidated verdict determination rules or analysis ordering rules) and allow an administrator to run queries to receive and organize cybersecurity intelligence from the global data store 260 for display. The customer portal 246 may be used to issue queries and access cybersecurity intelligence associated with that customer within the global data store (via the data management logic 285). The cybersecurity intelligence may be used, for example, in enhanced detection, remediation, investigation and reporting. The type of amount of cybersecurity intelligence made available to the administrator via the administrative portal 245 may exceed the amount of data made available to the customer via the customer portal 246.

In various embodiments, the cybersecurity sensor $220_1$ accesses the cybersecurity intelligence on a "push" or "pull" basis. Moreover, the cybersecurity intelligence can be furnished as general updates to the cybersecurity sensor $220_1$ (or other consumers 210) based on consumer type, subscription type when access to the cybersecurity intelligence hub is controlled by subscription (e.g., different levels of access, different quality of service "QoS", etc.), or the type of information that the consumer 210 (or its enterprise/subscribing customer) may find useful. Alternatively, the cybersecurity intelligence can be accessed by the cybersecurity sensor $220_1$ (or other consumers 210 via an interface logic) to "pull" intelligence relevant to a particular detection, remediation, or investigation, for example, to provide context and other information regarding specific actual or potential cyber-attacks. For this, the global data store 260 can be accessed by the cybersecurity sensor $220_1$ (or other consumers 210), for example, using a hash value, checksum or other distinctive metadata associated with the artifact as a look-up index to obtain consolidated meta-information regarding the artifact (whether identified as malicious, benign or unknown).

2. Second Embodiment

Alternatively, according to another embodiment of the disclosure, it is contemplated that a preliminary malware analysis of the artifact 270 may be conducted by the network device 224 (e.g., an endpoint) in lieu of the cybersecurity sensor $220_1$. Hence, for this embodiment, the network device 224 sends meta-information 272 to the cybersecurity sensor $220_1$, and the cybersecurity sensor $220_1$ does not perform any static or behavioral analyses on the artifact 270. Rather, the cybersecurity sensor $220_1$ is performing correlation across detected meta-information (e.g., events, objects, etc.) that are reported from multiple agents to the cybersecurity sensor $220_1$ supporting these agents. The distinctive metadata (e.g., object ID) from the meta-information 272 may be used in controlling what meta-information is uploaded to the cybersecurity intelligence hub 110 as described above. As a result, depending on the embodiment, a cybersecurity sensor can be designed to perform (a) aggregation of artifacts found by other network devices, with or without correlation across artifacts and/or devices, and with or without further analysis and, in some cases, classification to generate a verdict, or (b) detection of artifacts itself (e.g., in network traffic, emails or other content), with or without further analysis and, in some cases, classification to generate a verdict.

C. Data Management and Analysis Engine (DMAE)

As shown in FIGS. 2A-2B, for this embodiment of the disclosure, the DMAE 240 includes an analytics logic 280, data management logic 285 and a plurality of plug-ins $290_1$-$290_N$ (N≥1) communicatively coupled to and registered with the analytics logic 280. Each plug-in $290_1$-$290_N$ may provide the DMAE 240 with a different configurable and updateable functionality. Moreover, at least some of the plurality of plug-ins $290_1$-$290_N$ may be in communication with each other, notably where analysis results produced by one plug-in operate as an input for another plug-in.

In accordance with one embodiment of the disclosure, via communication interface 230, the analytics logic 280 receives request messages for cybersecurity intelligence from the consumers 210, including the cybersecurity sensors $220_1$-$220_M$. The analytics logic 280 parses the request message 226, and based on its type and/or content within the meta-information 272, determines one or more plug-ins to process the request message 226. More specifically, according to one embodiment of the disclosure, the analytics logic 280 is communicatively coupled to a plurality of software modules (e.g., plug-ins) installed within the DMAE 240 to assist in responding to the request messages. Herein, for this embodiment, the analytics logic 280 parses the request message 226 to obtain at least a portion of the meta-information (e.g., distinctive metadata), selects one or more plug-ins $290_1$, . . . , or $296_N$ to receive the portion of the meta-information, receives results from the one or more plug-ins $290_1$, . . . , or $296_N$, and processes the results to determine the consolidated verdict in accordance with analytic rules 282, including consolidated verdict determination rules 283.

The consolidated verdict determination rules 283 may be static (e.g., no known consolidated verdict selected unless all known verdicts are consistent) or may be configurable. Examples of these configurable rules 283 for use in selecting a particular classification for the consolidated verdict may include, but are not limited or restricted to the following: (i) a source-based analysis where the consolidated verdict is selected as the verdict provided from the most reliable source (e.g., analyst; blacklist; dynamic analysis results; . . . third party results . . . ); (ii) weighted analysis where the consolidated verdict is selected based on a weighting of one or more factors, including (a) source of verdict (e.g., most reliable and thus associated with a higher weight), (b) configuration of the requesting network device (e.g., security level, enabled features, GUI type, OS type, etc.) (e.g., where the configuration closest to that of interest to a customer is associated with a higher weight), (c) type of analysis conducted to render the verdict (e.g., where certain analysis may be deemed more reliable and be associated with a higher weight), (d) time of verdict determination (e.g., where more recent verdict or a group of two or more consistent recent verdicts (e.g., regardless of inconsistent prior verdicts) may be deemed more reliable and be associated with a higher weight), (e) geographic origin of the artifact associated with the verdict (e.g., where certain locations may be deemed associated with a higher weight), or the like; or (iii) a time-based analysis where the consolidated verdict is set to an "unknown" classification upon determining that one verdict or multiple verdicts are aged longer than a prescribed duration, and thus, may cause an additional detailed analysis to be conducted on the artifact that the results of the analysis may be returned to the global data store to overwrite an aged entry.

It is contemplated that the analytics logic 280 is configured to select (invoke) the one or more plug-ins for processing of a request message (request or query) in accordance with a prescribed order, based on a request type and meta-information, or based on results of a prior analysis by a plug-in. More specifically, one selection process may involve the analytics logic first selecting an available plug-in with highest accuracy (confidence) level (e.g., blacklist plug-in, whitelist plug-in, etc.) and the request is processed over a number of plug-ins according to the latency demands for the return of a consolidated verdict. Additionally, the analytics logic may be configured to analyze portions of the meta-information within the request or portions of analysis results from another plug-in to determine a next plug-in to invoke as further analysis is needed to render a consolidated verdict. The selection of the next plug-in may be in accordance with analysis ordering rules, which may be configurable and/or stored with the consolidated verdict determination rules.

According to another embodiment of the disclosure, the analytics logic 280 may be configured to also analyze the received, consolidated meta-information in accordance with the consolidated verdict determination rules 283 described above. Some of these rules 283 may be coded to preclude the return of a requested verdict unless a prescribed number of analysis results conclude the same, consistent verdict from the same source or from different sources. The analytics logic 280 performs such operations to mitigate false positive/negative results due to, for example, insufficient intelligence and/or conflicting verdicts. Conflicting verdicts may be especially prevalent as malware analyses may be performed with different operating systems (OSes), different application versions, or the like, which may contain different types or levels of vulnerabilities exploitable by cyber-attackers.

As an illustrative example, the cybersecurity sensor $220_1$ of FIG. 1 may be configured to send the request message 226 corresponding to a verification request to re-confirm the verdict associated with the artifact 270. Responsive to receiving the verification request message 226, the analytics logic 280 parses the request message 226 and determines one or more plug-ins (e.g., plug-ins $290_1$ and/or $290_2$) to handle the verification request. For this embodiment, the plurality of plug-ins $290_1$-$290_N$ may include a first set (one or more) of plug-ins 292 to handle low-latency requests (e.g., response time with a maximum latency less than or equal to a prescribed duration such as less than a few seconds), a second set of plug-ins 294 to handle requests other than low-latency requests, and a third set of plug-ins 296 may operate in the background to generate additional cybersecurity intelligence for enhancing cyber-attack detection and response. The management subsystem 250 monitors for a triggering event, and upon detection, activates one or more of the third set of plug-ins 296 via the analytics logic 280. These plug-ins 296 are selectively activated based on the operation to be conducted (e.g., trend analysis, campaign detection, retroactive reclassification, etc.).

Additionally, or in the alternative, the plurality of plug-ins $290_1$-$290_N$ may be segmented so that the first set of plug-ins 292 is configured to handle operations associated with a first artifact type (e.g., executables) while the second set of plug-ins 294 and/or the third set of plug-ins 296 are configured to handle operations associated with artifact types different than the first artifact type (e.g., non-executables such as Portable Document Format "PDF" documents, word processing documents, files, etc.). The data management logic 285 is configured to manage organization (e.g., normalize data into a selected data structure, updating index mapping tables, etc.), retrieval (read) and storage (write) of the cybersecurity intelligence within the global data store 260.

As another illustrative embodiment, the cybersecurity intelligence hub 110 may be configured to receive the request message 226 via a network 225 from the cybersecurity sensor $220_1$. Responsive to the request message 226 being directed to a low-latency operation (e.g., verifying a verdict associated with an artifact under analysis), the analytics logic 280 may select a single plug-in or multiple plug-ins operating in a serial or parallel manner (e.g., plug-ins $290_1$-$290_3$) from the first set of plug-ins 292. The selected plug-in(s) (e.g., plug-in $290_1$) signals the data management logic 285 to check the global data store 260 for an entry 276 for that particular artifact. Upon locating the entry 276, the data management logic 285 retrieves meta-information 287 from the entry (e.g., verdict 274 and perhaps other meta-information 278 associated with the prior evaluated artifact such as source, software profile utilized for analysis, timestamp, etc.) and provides the retrieved meta-information 287 to the selected plug-in $290_1$.

Thereafter, according to one embodiment of the disclosure, the selected plug-in $290_1$ returns, via the analytics logic 280, at least a portion of the meta-information 287 to the requesting cybersecurity sensor $220_1$. During this verification operation, the analytics logic 280 tracks the request message 226 (and the requesting sensor $220_1$) and may cause the communication session through the communication interface 230 to remain open so that a response may be provided during the same communication session. Such tracking may be accomplished through a mapping table or another similar data structure (not shown).

According to another embodiment of the disclosure, instead of simply controlling communications between the selected plug-in $290_1$ and the data management logic 285, the analytics logic 280 may be configured to analyze the retrieved meta-information 287 in accordance with a plurality of analytic rules 282 that govern operability of the analytics logic 280 and are updatable via the administrative portal 245. More specifically, the plurality of analytic rules 282 include consolidated verdict determination rules 283 and analysis ordering rules 281. The analytics logic 280 operates in accordance with the consolidated verdict determination rules 283 to generate a consolidated verdict for an artifact associated with meta-information provided with the request message 226. The analytics logic 280 may further operate in accordance with the analysis ordering rules 281 that may identify an order in processing of the meta-information 272 (and the resultant analysis results) by the registered plug-ins $290_1$-$290_N$.

Herein, illustrated as part of the analytic rules 282, the consolidated verdict determination rules 283 may be static or configurable (e.g., via administrative portal 245). Where the consolidated verdict determination rules 283 promote a source-based analysis, the analytics logic 280 may determine a particular classification for the consolidated verdict based on the verdict provided from the most reliable source (or analysis). For example, where the selected plug-in $290_1$ recovers five (5) verdicts, where some of the verdicts are third party sources of a less reliable nature and one verdict is from full dynamic analysis by a cybersecurity sensor, the configurable rules 283 may be coded to select the consolidated verdict associated with the dynamic analysis verdict. Alternatively, the configurable rules may be directed to a weighting operation, where weightings for each of the five verdicts are provided and the consolidated verdict is based on the known verdict (malicious or benign) having the largest collective weighting or some other statistically relevant basis (e.g., average weighting, etc.). Alternatively, the weighted analysis may take into account other factors besides the verdict such as (a) the source of verdict, (b) the configuration of the requesting network device (e.g., security level, enabled features, run-time environment, OS type, etc.), (c) the type of analysis conducted to render the verdict, (d) the time of verdict determination, (e) the geographic origin of the artifact associated with the verdict, or the like.

Herein, the analytic rules 282 may further preclude the return of a "malicious" or "benign" verdict when a number of prior analyses (which may be from one or more sensors) reaching the same, consistent verdict falls below a prescribed verdict count threshold (e.g., two or more consistent verdicts, at least ten consistent verdicts, etc.). Some embodiments may use a first count threshold for consistent malicious verdicts and a higher second count threshold for a benign consistent verdict. Hence, before returning at least the portion of meta-information 287 to the requesting cybersecurity sensor $220_1$, the analytics logic 280 alters the meta-information 287 by setting the verdict as "unknown".

As another example, the analytic rules 282 may preclude the return of a "malicious" or "benign" verdict in response to conflicting verdicts by considering contextual information (e.g., software profile, source, timestamp, etc.) in reaching its consolidated verdict for return to the cybersecurity sensor $220_1$, which may be at odds with the prior system-specific verdicts. For example, if the prior analyses all examined the artifact's behaviors in a software environment including an OSX® operating system (OS) and applications running thereon, but the requesting cybersecurity sensor $220_1$ is encountering the artifact within a different software environment, such as a Windows® OS, the consolidated verdict may indicate an "unknown" (or "indefinite") status and/or may simply give a recommendation 275 for further analysis in the Windows® environment. The recommendation 275 from the analytics logic 280 may advise on a heightened or lower risk of maliciousness. For a heightened risk, further analysis of the artifact 270 may be warranted or even immediate remedial action may be appropriate. For a lower risk, the requesting cybersecurity sensor $220_1$ may terminate an in-process malware analysis (or a scheduled malware analysis).

Although not shown, as an alternative embodiment, in lieu of accessing the global data store 260 via the data management logic 285, one or more of the plug-ins $290_1$-$290_N$ may directly access the global data store 260. Herein, the one or more of the plug-ins $290_1$-$290_N$ would obtain the cybersecurity intelligence for enhanced detection functionality by receipt of a prior verdict as a definitive finding of an artifact's benign or malicious classification or as additional classification information used in subsequent analysis and classification of the artifact 270.

In various embodiments, the cybersecurity intelligence (e.g., meta-information within response message 228) can be furnished to the requesting cybersecurity sensor $220_1$ (or other consumers) on a "push" or "pull" basis. Moreover, the type and amount of cybersecurity intelligence can be furnished to the cybersecurity sensor $220_1$ (or other consumers) based on customer type, subscription type, geographic restrictions, or other types of information that the consumer (or its enterprise/subscribing customer) may find useful. The cybersecurity intelligence may constitute general updates to locally stored cybersecurity intelligence at the cybersecurity sensor $220_1$. Alternatively, the cybersecurity intelligence can be accessed by the cybersecurity sensor $220_1$ (or other consumers) to "pull" meta-information from the cybersecurity intelligence hub 110 relevant to a particular detection, remediation, or investigation, for example, to provide context and other information regarding specific actual or potential cyber-attacks.

For example, where an artifact is initially determined to be benign by a first source 202, and subsequently classified as malicious by a second source 204 conducting a later and/or more in-depth analysis, the cybersecurity intelligence hub 110 may provide updated meta-information (e.g., corrected verdict) to the cybersecurity sensor $220_1$ to retroactively re-classify the artifact 270 as malicious and notify any customers that received the benign verdict for the artifact 270 with the corrected verdict. As a first illustrative example, the retroactive re-classification may occur based on the second source 204 performing a behavioral malware analysis while the first source 202 may have relied on static malware analysis. As a second illustrative example, both the first and second sources 202 and 204 may perform a behavioral malware analysis, but using different software images resulting in different classifications (for example, where the second source 204 uses a software image with software vulnerable to an exploit). As another illustrative example, the retroactive re-classification may occur when the second source 204 performs behavioral analyses based on a different (and more advanced) set of rules than the rule set utilized by the first source 202. This re-classification operation may be performed by a re-classification plug-in (described below).

D. Illustrative Plug-Ins

Figure 6:
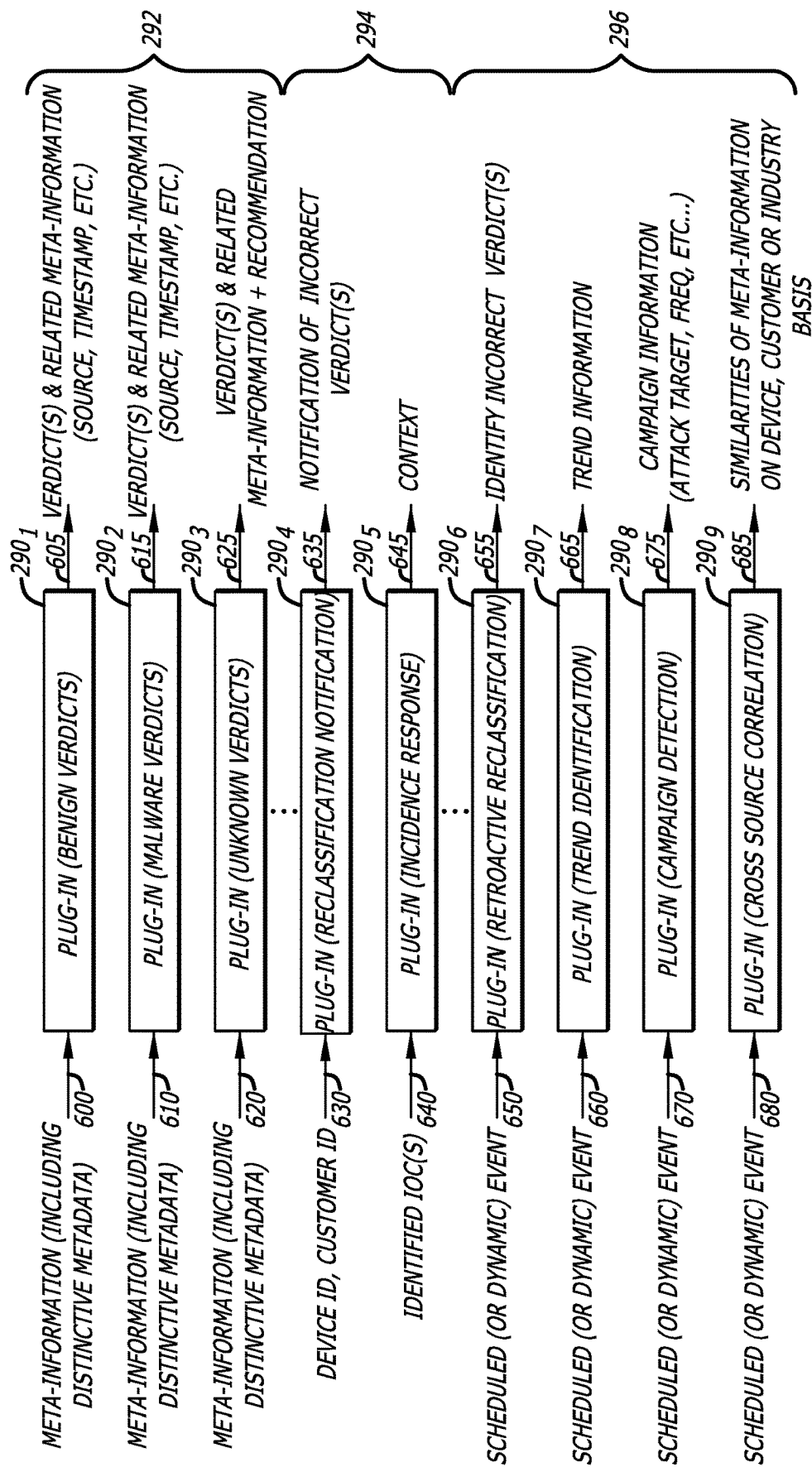
FIG. 6 is an exemplary flow diagram of operations conducted by different sets of plug-ins illustrated in FIGS. 2B-2C.

As an illustrative example, the plurality of plug-ins $290_1$-$290_N$ are deployed within the cybersecurity intelligence hub 110 and are registered as a member to one of the sets of plug-ins (e.g., first set 292 and second set 294). The registration may be used to identify the logic to which the additional functionality is directed (e.g., plug-ins for handling low-latency requests, plug-ins for handling normal or even high latency requests, etc.). The third set of plug-ins 296 is not request-driven; rather, these plug-ins 296 are activated in response to a triggering event (e.g., scheduled or dynamic event). It is contemplated, however, that certain plug-ins from the second set of plug-ins 294 may be configured for operation as a plug-in for the third set of plug-ins 296 and vice versa. Illustrative examples of different plug-in types, where each of these plug-ins may operate independently or in parallel with any other plug-in, are illustrated in FIG. 6 and described below.

E. Secondary Embodiment—Cybersecurity Intelligence Hub

Figure 2C:
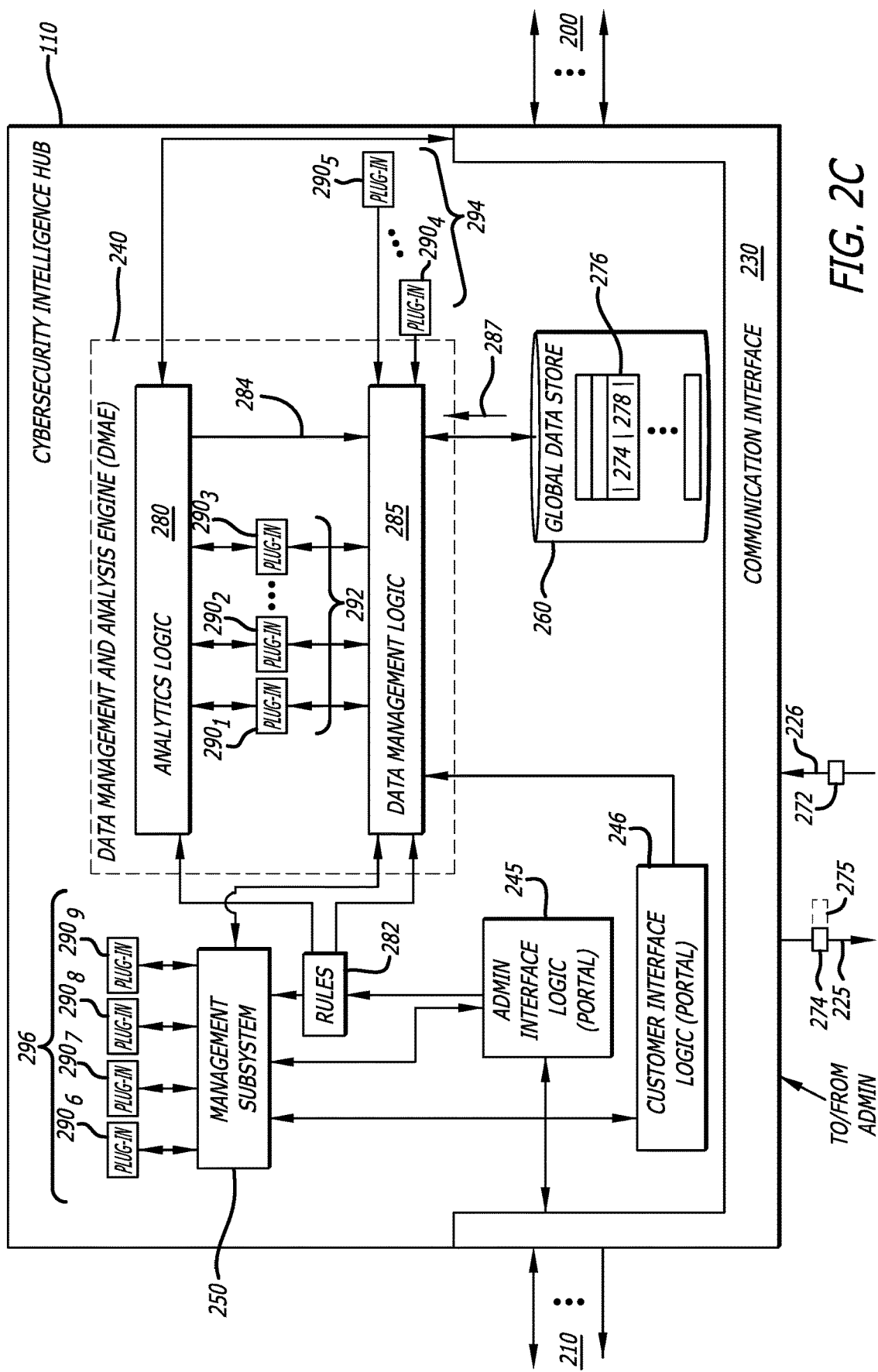
FIG. 2C is a second exemplary embodiment of the cybersecurity intelligence hub of FIG. 1.

Referring now to FIG. 2C, a second exemplary embodiment of the cybersecurity intelligence hub 110 of FIG. 1 is shown. Depending on its functionality, the plurality of plug-ins $290_1$-$290_N$ may be segmented among the analytics logic 280, the data management logic 285, and the management subsystem 250. For instance, the first set of plug-ins 292 may be directly coupled to the analytics logic 280 to handle time-sensitive requests while the second set of plug-ins 294 may be directly coupled to the data management logic 285 to handle requests directed to gathering cybersecurity intelligence (stored meta-information) that is less time-sensitive (e.g., stored meta-information for updating purposes, etc.). Of course, certain plug-ins of the first set of plug-ins 292 may be communicatively coupled with other plug-ins within the first set of plug-ins 292 or the second set of plug-ins 294 for conducting a more expansive analysis, when needed.

Additionally, according to another embodiment of the disclosure, operating with the DMAE 240, the management subsystem 250 of the cybersecurity intelligence hub 110 may be communicatively coupled to the third set of plug-ins 296, which are configured to generate additional cybersecurity intelligence based on analyses of stored cybersecurity intelligence within the global data store 260. In response to a triggering event, the management subsystem 250 invokes one or more plug-ins of the third set of plug-ins (e.g., plug-ins $290_6$-$290_9$), which is configured to retrieve stored cybersecurity intelligence within the global data store 260 via the data management logic 285 and generate additional cybersecurity intelligence. The additional cybersecurity intelligence may be stored in the global data store 260. Hence, the cybersecurity intelligence hub 110 can be leveraged to provide more effective protection against cyber-attacks.

In the event that the management subsystem 250, analytics logic 280 and the data management logic 285 monitor the reliability of the verdict based on count (e.g., the number of analyses conducted for a particular artifact), the analytic rules 282 are accessible to each of these components. However, the analytics logic 280 still may categorize all request messages received from the cybersecurity sensor $220_1$ and pass those request messages handled by the second set of plug-ins 294 to the data management logic 285 via logical path 284.

For instance, as described above and illustrated in FIGS. 2A-2C, the trend plug-ins $290_7$ is configured to analyze the stored meta-information within the global data store 260 for cyber-attack trends across enterprises, industries, government agencies, or geographic locations while the campaign plug-ins $290_8$ is configured to identify targeted and deliberate cyber-attacks based on repetitious attempts, e.g., to infiltrate and disrupt operations of a targeted network device and/or exfiltrate data therefrom, where the campaigns may be detected for a particular victim by one or more sensors of a single customer or by sensors serving customers across an industry, geography, or computing environment (e.g., operating system, version number, etc.). Such analysis assists in predicting (and warning) of potential or hidden, but on-going, cyber-attacks based on historical information. Also, the correlation plug-in $290_9$ may be configured to perform a correlation operation across the stored cybersecurity intelligence related to an artifact, or even across a plurality of artifacts to develop consolidated meta-information (results) to identify sophisticated cyber-attacks targeting different network devices, networks or customers associated with different cybersecurity sensors, as described below.

In yet another inventive aspect, the exchanges between the cybersecurity intelligence hub 110 and the consumers 210 and $220_1$-$220_N$ may cause a consumer (e.g., cybersecurity sensor $220_1$) to take action in response to the supplied cybersecurity intelligence 125. For example, where cybersecurity sensor $220_1$ receives the cybersecurity intelligence relevant to a recently received artifact that has been determined by a second cybersecurity sensor $220_N$ to be malicious, the cybersecurity sensor $220_1$ may (1) queue the artifact 270 in question for priority/immediate deep analysis, and/or (2) issue an immediate alert. The cybersecurity intelligence generated in response to the analysis of the consolidated meta-information may be translated into heuristic rules, signatures, and/or other identifiers that may be distributed by the cybersecurity intelligence hub 110 to some or all of the sources and consumers, especially the community of cybersecurity sensors $220_1$-$220_N$, for use in identifying malicious artifacts and preventing such artifacts from executing on or laterally moving from the cybersecurity sensor $220_1$.

Additionally, where the cybersecurity sensor $220_1$ receives meta-information from the DMAE 240 that warrants issuance or initiation of an alert, the cybersecurity sensor $220_1$ also may implement a more robust protection regime. This may occur, for example, during a high threat situation, e.g., a cyber conflict, public infrastructure attack, political election (e.g., targeting an election commission, etc.). It may also occur when the DMAE 240 identifies a new threat type (e.g., new type of malware, for example, carried by a particular file type, exploiting a new version of an operating system or application, or directed at a particular industry or government).

As shown in FIGS. 2B-2C, via the administrative portal 245 and management subsystem 250, authorized administrators and cybersecurity providers may upload meta-information into the global data store 260 and conduct searches for certain stored meta-information within the global data store 260. As an example, a security administrator may initiate a query in accordance with a selected search syntax to retrieve reclassified verdicts as described herein, meta-information associated with certain artifact types (e.g., executables, particular type of non-executable, etc.) stored into the global data store 260 during a predetermined period of time, or the like. Customers may conduct similar queries with results directed to that particular customer (and not platform-wide).

As another example, incident responders to a cyber-attack may identify a certain type of artifact (e.g., indicators of compromise "IOCs") in a network. However, by comparing to the meta-information associated with the IOCs in the global data store 260, whether by searching for an object ID (e.g., hash value) or by IOCs ID (e.g., identifying behaviors), it is contemplated that additional metadata (in lieu of or in addition to the IOCs) may be returned as an enhanced report. The enhanced report may include any connection to malicious websites, additional IOCs in the global data store 260 that may assist in identifying lateral of malware (and the amount of lateral spread), common name of detected malware, or the like. For this embodiment, the request message sent by the cybersecurity provider (incident responder) to the cybersecurity intelligence hub 110 may identify a single IOC or a plurality (or pattern) of IOCs, which are used as an index to identify an entry in the global data store 260.

The analytics logic 280 may identify and return consolidated meta-information within the single entry or plural entries in the global data store 260, each entry containing information regarding previously encountered incidents exhibiting IOCs having a correlation (equal to or above a prescribed level of correlation) with the requested IOCs. The returned cybersecurity information may include the verdict (if any) included in those entries. The returned cybersecurity information can be used by the incident responder for various purposes, such as to guide further investigations (e.g., by specifying IOCs that have previously been known to accompany those included in the request but were not yet observed for the current incident).

Figure 3A:
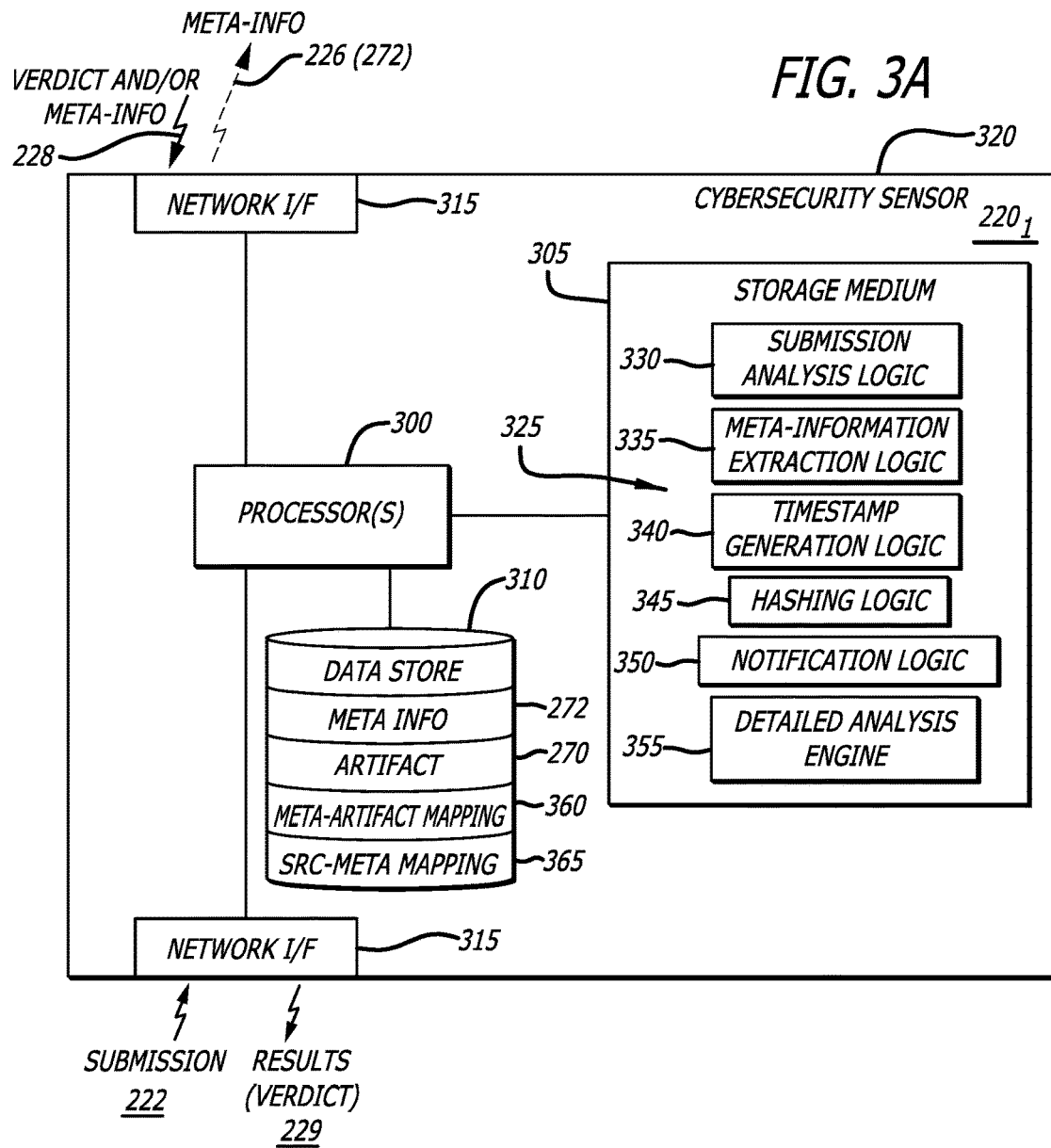
FIG. 3A is a first exemplary embodiment of the logical architecture of the cybersecurity sensor deployed within the comprehensive cybersecurity system of FIG. 1

Referring now to FIG. 3A, a first exemplary embodiment of the logical architecture of the cybersecurity sensor $220_1$ deployed within the comprehensive cybersecurity platform (CCP) 100 of FIG. 1 is shown. According to this embodiment of the disclosure, the cybersecurity sensor $220_1$ comprises a plurality of components, including one or more hardware processors 300 (referred to as "processor(s)"), a non-transitory storage medium 305, a data store 310, and one or more network interfaces 315 (each referred to as "network I/F"). Herein, when the cybersecurity sensor $220_1$ is a physical network device, these components are at least partially encased in a housing 320, which may be made entirely or partially of a rigid material (e.g., hard plastic, metal, glass, composites, or any combination thereof) that protects these components from environmental conditions.

In an alternative virtual device deployment, however, the cybersecurity sensor $220_1$ may be implemented entirely as software that may be loaded into a network device (as shown) and operated in cooperation with an operating system ("OS") running on that device. For this implementation, the architecture of the software-based cybersecurity sensor $220_1$ includes software modules that, when executed by a processor, perform functions directed to functionality of logic 325 illustrated within the storage medium 305, as described below. As described below, the logic 325 may include, but is not limited or restricted to, (i) submission analysis logic 330, (ii) meta-information extraction logic 335, (iii) timestamp generation logic 340, (iv) hashing (or checksum) logic 345, (v) notification logic 350, and/or (vi) detailed analysis engine 355.

The processor 300 is a multi-purpose, processing component that is configured to execute logic 325 maintained within the non-transitory storage medium 305 operating as a memory. One example of processor 300 includes an Intel® (x86) central processing unit (CPU) with an instruction set architecture. Alternatively, processor 300 may include another type of CPUs, a digital signal processor, an Application Specific Integrated Circuit (ASIC), a field-programmable gate array, or any other hardware component with data processing capability.

As shown, the network interface(s) 315 may be configured to receive a submission 222, including at least the meta-information 272, from the network device 224. The meta-information 272 and/or artifact 270 may be stored within the data store 310 prior to processing. It is contemplated that the artifact 270 corresponding to the meta-information 272 may be requested by the cybersecurity sensor $220_1$ and cybersecurity intelligence hub 110 when the artifact 270 is needed by the cybersecurity intelligence hub 110 to determine verdict. A mapping between the meta-information 272 and the artifact 270 (referred to as "Meta-Artifact mapping 360") is maintained by the cybersecurity sensor $220_1$ and stored within the data store 310. More specifically, the mapping 360 may be accomplished by assigning a distinct identifier to the meta-information 272 and the artifact 270 pairing. It is further contemplated that source-to-meta-information (SRC-Meta) mapping 365 may be utilized to identify the source of the meta-information 272 to return verdicts, discern target (among the customers including the "requesting customer" for alerts concerning artifacts associated with the submitted meta-information 272, and the like.

Referring still to FIG. 3A, the processor(s) 300 processes the meta-information extraction logic 335 which, during such processing, extracts the meta-information 272 from the received submission 222. Additionally, the processor(s) 300 processes the timestamp generation logic 340 to generate a timestamp that generally represents a time of receipt of the meta-information 272 (and artifact 270 if provided), although it is contemplated that the timestamp generation logic 340 is optional logic as the timestamp may be generated at the network device 224. Where the artifact 270 is provided with the submission 222, the processor(s) 300 process the submission analysis logic 330, which conducts an analysis of at least a portion of the submission 222, such as the artifact 270 for example, to determine whether the artifact 270 is suspicious. As another optional component, the hashing logic 345 may be available to the processor(s) 300 to produce a hash value of the artifact 270 for storage as part of the meta-information 272, provided the hash value is not already provided as part of the meta-information 272.

The meta-information 272 (and/or artifact 270) may be temporarily stored and accessible for use in determining whether the artifact 270 has been previously analyzed. The determination may be accomplished by comparing distinctive metadata within the meta-information 272, which may be identified in meta-information provided from the endpoint 224 (e.g., tagged, stored in a particular location within the data structure of the meta-information 272, etc.), to locally stored meta-information associated with prior evaluated artifacts (referred to as "prior meta-information").

As further shown in FIG. 3A, the cybersecurity sensor $220_1$ is configured to transmit a first type of request message 226 to determine whether the artifact 270 of the submission 222 has been previously analyzed and return a response message 228, which includes a verdict of such analysis (benign, malicious, unknown) and/or additional meta-information associated with the prior evaluated artifact and/or analysis. The verdict 229 may be returned to the network device 224. The additional meta-information may be stored in the data store 310 and related to the artifact 270 (e.g., stored as meta-information associated with the artifact 270). Herein, the additional meta-information may include distinctive metadata (e.g., hash value) associated with the prior evaluated artifact, the software profile used during analysis of the prior evaluated artifact, timestamp as to the analysis of the prior evaluated artifact, a source of the prior evaluated artifact, or the like.

Responsive to a malicious verdict, the processor(s) 300 processes the notification logic 350, which generates or initiates the generation of an alert directed to a security administrator associated with a source of the submission 222 that the artifact 270 has been determined as "malicious." This may prompt the security administrator to quarantine (or temporarily remove) the "user" network device that uploaded the submission to allow the security administrator to disinfect the network device. Also, when implemented, the processor(s) 300 may process the detailed analysis engine 355, which performs additional analyses (e.g., behavioral analyses, static analyses, etc.) on the artifact 270 to re-confirm benign or malicious classification, or in response to receipt of an "unknown" classification, to perform or initiate the performance of such analyses to determine whether the artifact 270 may not be determined as "benign" or "malicious." It is contemplated, however, that these additional analyses may be performed on a different network device other than the cybersecurity sensor $220_1$ as shown in FIG. 3B.

Figure 3B:
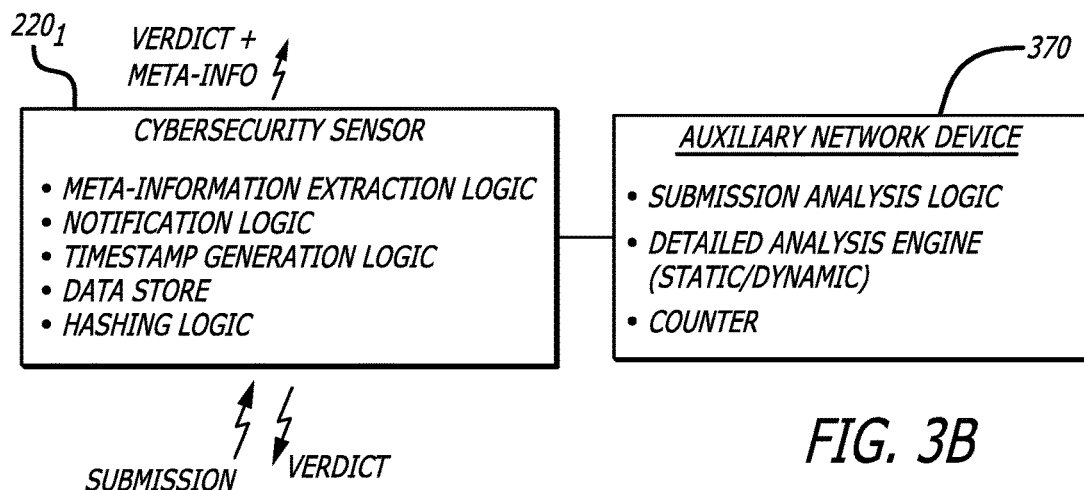
FIG. 3B is a second exemplary embodiment of the cybersecurity sensor collectively operating with an auxiliary network device deployed within or outside of the comprehensive cybersecurity system of FIG. 1.
Figure 3C:
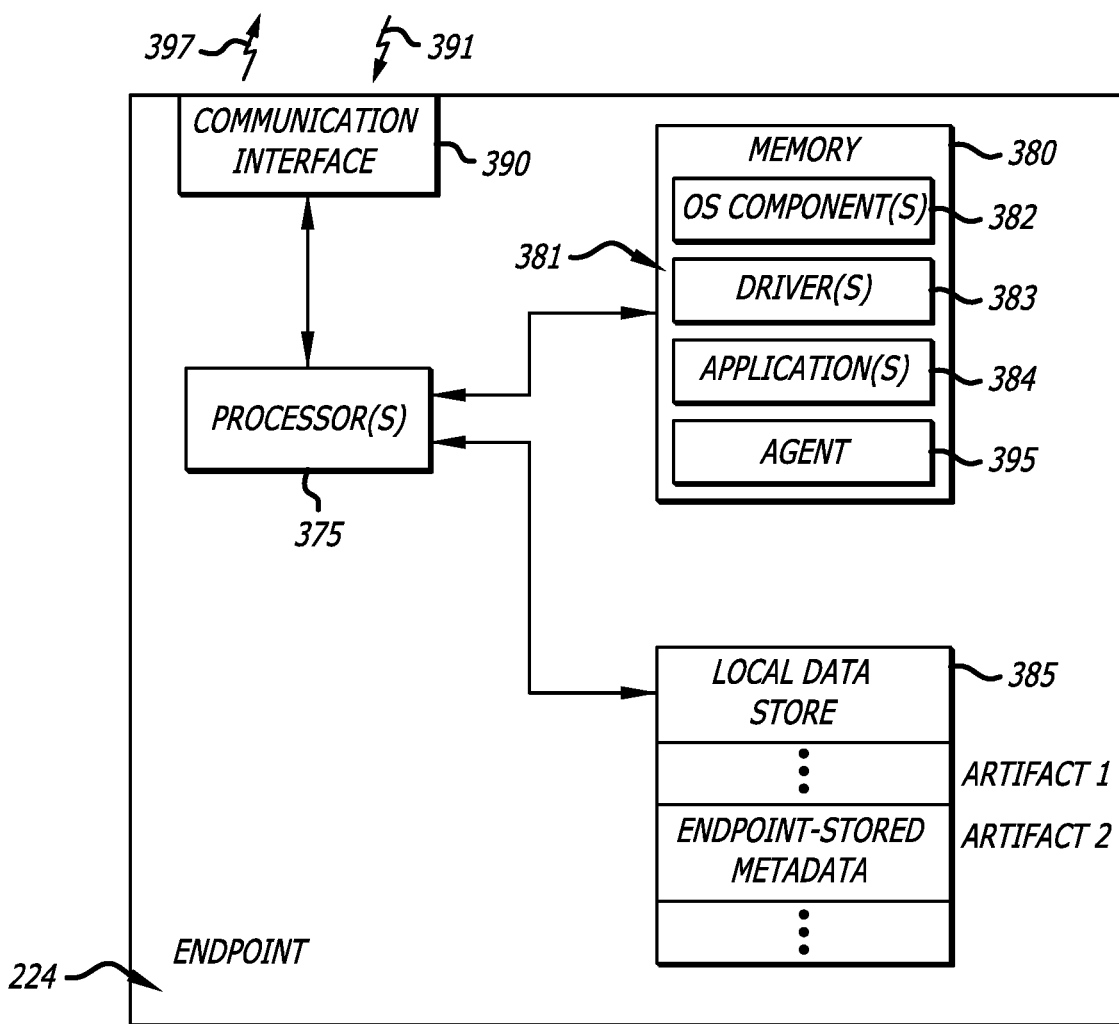
FIG. 3C is an exemplary embodiment of the logical architecture of an agent deployed within the comprehensive cybersecurity system of FIG. 1.

Referring to FIG. 3B, a second exemplary embodiment of the cybersecurity sensor $220_1$ collectively operating with an auxiliary network device 370 deployed within or outside of the comprehensive cybersecurity platform (CCP) 100 of FIG. 1 is shown. Herein, the functionality associated with the meta-information extraction logic 335, the timestamp generation logic 340 and the hashing logic 345 are performed by the cybersecurity sensor $220_1$ while the functionality associated with the submission analysis logic 330, the notification logic 350, and/or the detailed analysis engine 355 are performed by the auxiliary network device 370. It is contemplated that the functionality described above can reside within the cybersecurity sensor $220_1$ or may be organized in accordance with a decentralized scheme with multiple network devices performing such functionality in concert.

Referring now to FIG. 3C, an exemplary embodiment of the network device (endpoint) 224 deployed within the CCP 100 of FIG. 2A is shown. According to this embodiment of the disclosure, the network device 224 comprises a plurality of components, including one or more hardware processors 375 (referred to as "processor(s)"), a non-transitory storage medium 380, a local data store 385, and at least one communication interface 390. As illustrated, the endpoint 1301 is a physical network device, and as such, these components are at least partially encased in a housing.

As described, the hardware processor(s) 375 is a multi-purpose, processing component that is configured to execute logic 381 maintained within the non-transitory storage medium 380 operating as a memory. The local (e.g., on-premises) data store 385 may include non-volatile memory to maintain metadata associated with prior evaluated events in accordance with a prescribed storage policy (e.g., cache validation policy). The prescribed storage policy features a plurality of rules that are used to determine entry replacement and/or validation, which may impact the categorization of a detected, monitored event as locally "distinct" or not.

The communication interface 390 may be configured as an interface to receive an object 391 (broadly interpreted as an "artifact") via any communication medium. For instance, the communication interface 390 may be network adapter to receive the object 391 via a network, an input/output (IO) connector to receive the object 391 from a dedicated storage device, or a wireless adapter to receive the artifact via a wireless communication medium (e.g., IEEE 802.11 type standard, Bluetooth™ standard, etc.). The agent 395 may be configured to monitor, perhaps on a continuous basis when deployed as daemon software, for other artifacts (e.g., events or particular types of events) occurring during operation of the network device 224. Upon detecting a monitored event, the agent 395 is configured to determine whether the artifact (e.g., the object and/or the monitored event) is "distinct," as described herein.

For instance, an artifact may be an object (and/or any resultant events detected during processing of the object 391 using a stored application 384), or during other operations that are not directed to processing of a received object 391 (e.g., logon, attempted network connection, etc.). Especially for the object 391, the agent 395 may rely on the stored application 384, one or more operating system (OS) components 382, and/or one or more software driver(s) 383 to assist in collecting metadata associated with an artifact. When the agent 395 determines the artifact is "distinct" (e.g., distinctive metadata does not currently reside in the local data store 385), the collected metadata may be included as part of a submission 397 provided to the cybersecurity sensor $120_1$ of FIG. 1.

Figure 4:
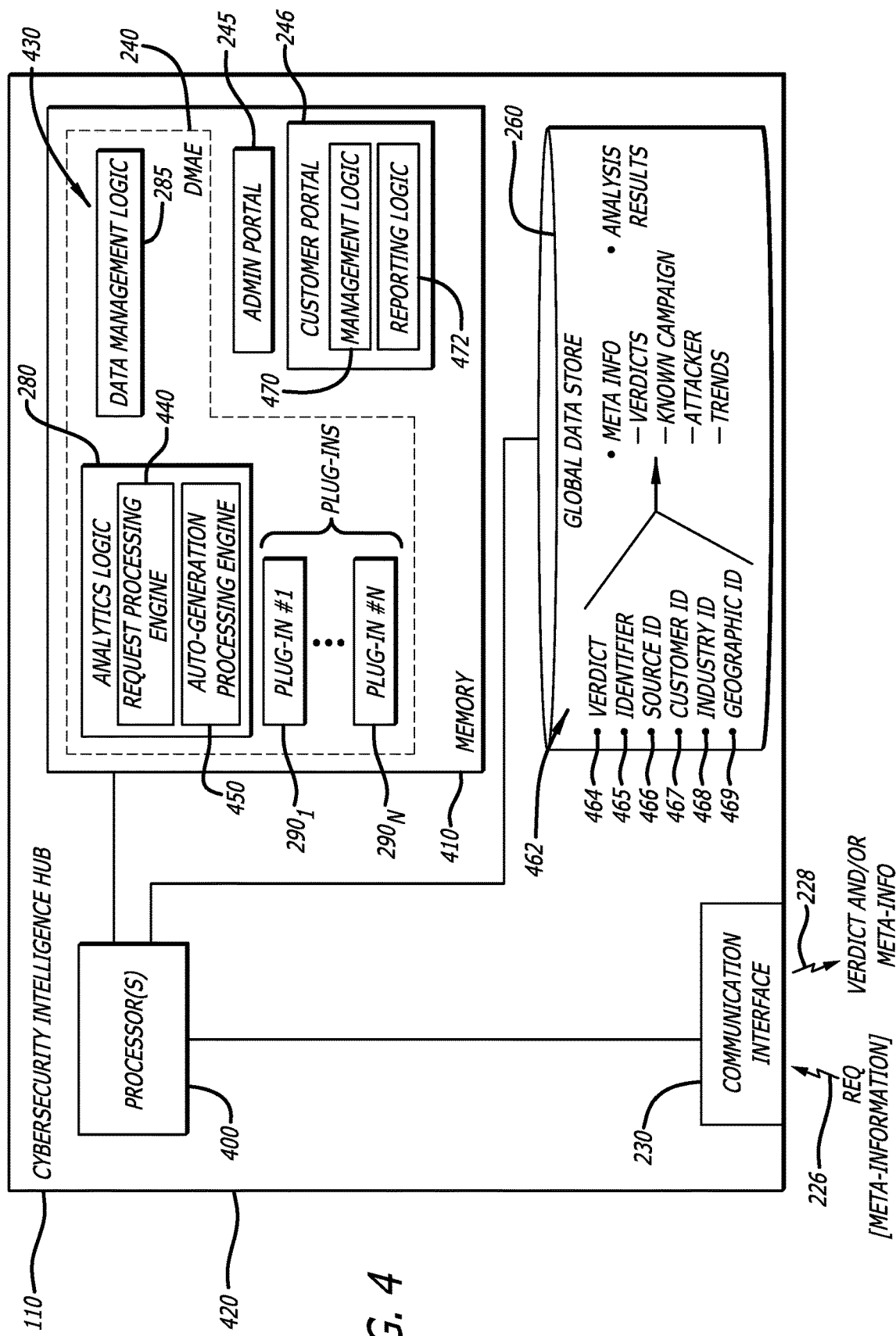
FIG. 4 is an exemplary block diagram of an exemplary embodiment of logic implemented within the cybersecurity intelligence hub of FIGS. 2A-2C.

Referring now to FIG. 4, a block diagram of an exemplary embodiment of logic implemented within the cybersecurity intelligence hub 110 of FIG. 2A is shown. According to this embodiment of the disclosure, the cybersecurity intelligence hub 110 comprises a plurality of components, including one or more hardware processors 400 (referred to as "processor(s)"), memory 410, the global data store 260, and the communication interface 230 configured to receive the request message 226, including at least meta-information 272 associated with the artifact 270 as shown in FIG. 2. Herein, when the cybersecurity intelligence hub 110 is a physical network device, these components are at least partially encased in a housing 420 to protect these components from environmental conditions, as described above.

Alternatively, in a virtual device deployment, the cybersecurity intelligence hub 110 may be implemented entirely as software that may be loaded into a network device and operated in cooperation with an operating system ("OS") running on that device. For this implementation, the architecture of the cybersecurity intelligence hub 110 includes software modules that, when executed by a processor, perform functions directed to functionality of logic 430 illustrated within the memory 410. As described below, the logic 430 may include, but is not limited or restricted to the DMAE 240, which may include (i) the analytics logic 280, (ii) the data management logic 285, and the plurality of plug-ins $290_1$-$290_N$. The operations of the analytics logic 280, the data management logic 285, and the plurality of plug-ins $290_1$-$290_N$ are described herein.

According to one embodiment of the disclosure, the analytics logic 280 features a request processing engine 440 and an auto-generation processing engine 450. The request processing engine 440 is configured to parse request messages for verdict verification and access to meta-information stored at the global data store 260. The auto-generation processing engine 450 is configured, responsive to a triggering event, to active one or more of the plurality of plug-ins $290_1$-$290_N$ (e.g., plug-ins $290_6$-$290_9$). These plug-ins are configured to verify the accuracy of the verdicts within the stored meta-information (e.g., retroactive re-classification) and/or generate additional cybersecurity intelligence based on the stored meta-information associated with prior evaluation artifacts (e.g., trend spotting, campaign detection, etc.). The analytics logic 280 is further able to provide access by administrators and customers, via the customer portal 246, to stored meta-information within the global data store 260.

The global data store 260 is configured to maintain a plurality of entries (not shown) in which one or more entries are allocated for storing meta-information 462 associated with a prior evaluated artifact. The stored meta-information 462 associated with each prior evaluated artifact may include, but is not limited or restricted to the following parameters: (i) a verdict 464 that identifies a current classification of the prior evaluated artifact; (ii) an identifier 465 (distinctive metadata) that specifically identifies the prior evaluated artifact under analysis (e.g., the artifact to which the stored meta-information 462 pertains); (iii) a source ID 466 (e.g., a specific identifier of the cybersecurity source of the stored meta-information 462); (iv) a customer ID 467 (e.g., a specific identifier of the customer associated with the source ID 466); (v) an industry ID 468 (e.g., a specific identifier of the industry pertaining to the customer); and/or (vi) a geographic ID 469 (e.g., a specific identifier pertaining to a geographic region in which the cybersecurity source resides). Each parameter 464-469 of the stored meta-information 462 could operate as an index used by a consumer via the customer portal 246 of FIG. 2B to search for cybersecurity intelligence. The cybersecurity intelligence may be directed to meta-information or analysis results pertaining to a particular artifact or group (two or more) of artifacts (e.g., artifacts related or temporally proximate to the particular artifact 270 such as a (parent) process that created another (child) process, etc.), a specific customer, industry or geography, or the like.

Besides some or all of the parameters 464-469, it is contemplated that one or more entries (allocated for storing the meta-information 462 associated with a prior evaluated artifact) may include additional meta-information directed to the cybersecurity intelligence 140-170 of FIG. 1 (e.g., uncovered campaign, trend, incident investigation/response intelligence, forensic analysis intelligence, analyst-based intelligence, third-party based intelligence, attacker intelligence, etc.). Also, results of prior analysis of the artifact may be stored within the global data store 260 and accessible.

Additionally, the memory 410 comprises the administrative portal 245 and the customer portal 246. The customer portal 246 further includes a management logic 470 and reporting logic 472. The management logic 470 may be adapted to authenticate a user (e.g., security administrator) requesting access to the cybersecurity intelligence hub 110, where authentication data (e.g., password, URL, customer identifier, etc.) may be obtained from a subscriber database (not shown). After user authentication, the management logic 470 permits a user to (i) gain access to stored content (e.g., meta-information, objects, etc.) with the global data store 260, (ii) configure the reporting logic 472 that, in response to search parameters associated with a query from a customer via the customer portal 246, generates and delivers a report pertaining to some of the stored content (e.g., meta-information), where the report is generated in accordance with a predefined or customized format. The administrative portal 245 has a similar architecture, and further permits the administrator to set configuration data within the cybersecurity intelligence hub 110 (e.g., set time or max count as triggering event for signaling the management subsystem 250 to activate a particular plug-in). This access to the global data store 260 may allow customers to leverage cybersecurity intelligence seen around the platform to generate additional cybersecurity intelligence (e.g., signatures, rules, etc.) based on the stored meta-information.

Figure 5:
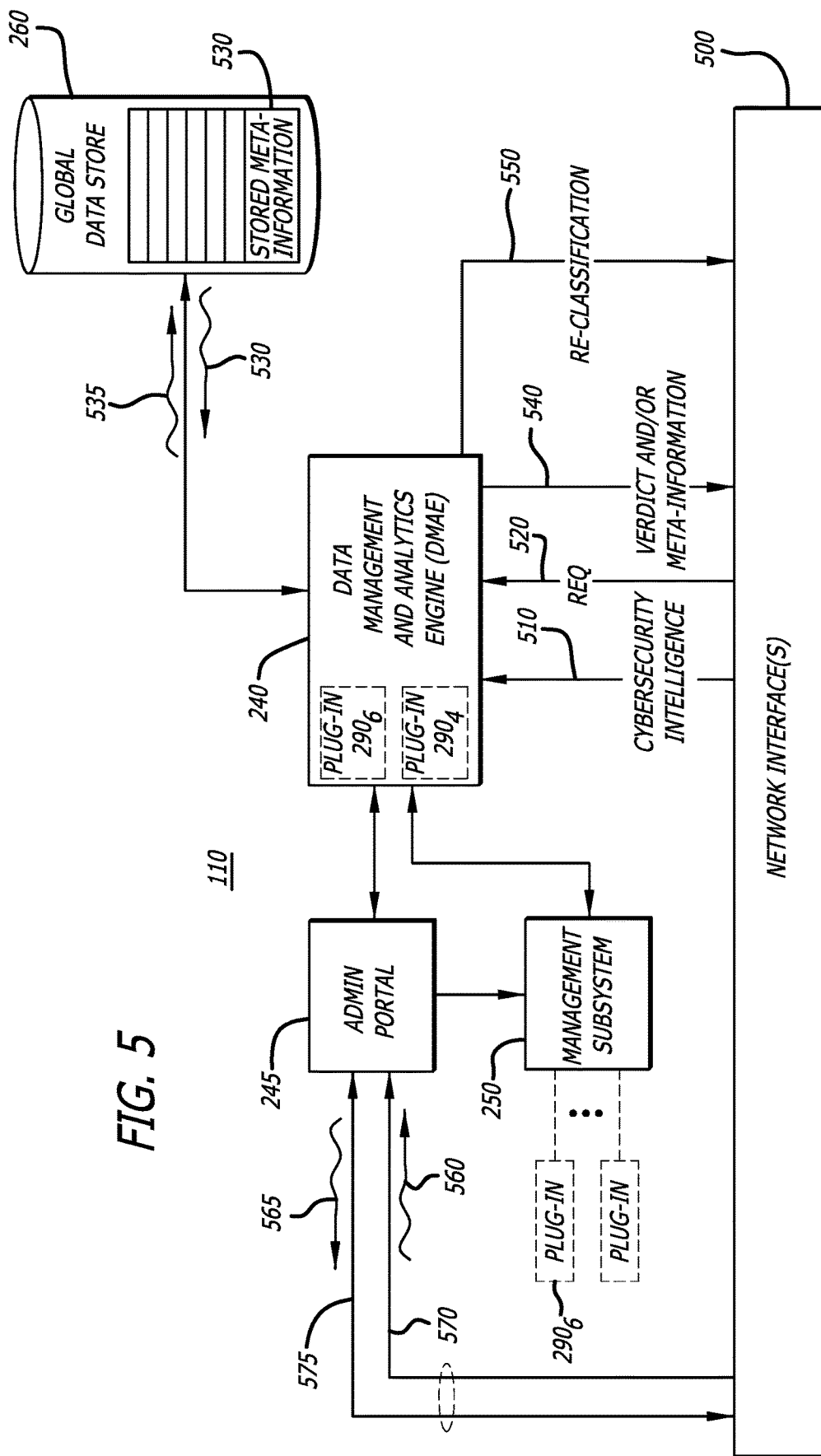
FIG. 5 is an exemplary block diagram of logic implemented within the cybersecurity intelligence hub of FIGS. 2A-2C and the signaling exchange via network interface(s).

Referring to FIG. 5, a block diagram of logic implemented within the cybersecurity intelligence hub 110 of FIGS. 2A-2C and the signaling exchange via network interface(s) 500 is shown. Herein, the cybersecurity intelligence hub 110 features the DMAE 240 including one or more plug-ins (not shown), a portal 245 (e.g., single portal with operability for administrative/customer access), the management subsystem 250, and the global data store 260. As shown, the DMAE 240 is configured to receive cybersecurity intelligence 510 from cybersecurity sources via the network interface(s) 500 as well as one or more request messages 520 from consumers (including cybersecurity sensors) via the network interface(s) 500.

More specifically, according to one embodiment of the disclosure, a first type of request message 520 may seek a verdict associated with a particular artifact in order to take advantage of prior analyses of the artifact. This scheme increases accuracy in cyber-attack detection while reducing (optimizing) the amount of time necessary to conduct malware analysis on an artifact. Herein, after receipt and processing of the request message 520, the DMAE 240 determines whether a portion of the meta-information associated with the particular artifact (e.g., distinctive metadata) matches a portion of the stored meta-information 530 associated with one or more prior evaluated artifacts maintained by the global data store 260. If so, the consolidated verdict along with at least a portion of the stored meta-information 530 is returned to the sensor via response message 540.

According to one embodiment of the disclosure, the portion of the stored meta-information 530 includes a verdict along with other meta-information such as context information (e.g., source of the prior evaluated artifact, timestamp, incident response information identifying more details of the prior evaluated artifact, successful or unsuccessful remediation attempts, etc.). This context information may assist in the remediation and/or prevention of further cyber-attacks where the artifact is classified as "malicious" and may assist in optimizing processing resources (i.e., avoiding in-depth analysis of the artifact) when the artifact is classified as "benign."

Alternatively, another type of request message 520 may cause the DMAE 240 to upload analysis results 535 for the particular artifact for storage within an entry or entries of the global data store 260. This request message 520 is to augment the stored meta-information 530 within the global data store 260 from cybersecurity intelligence gathered by a variety of sources.

Besides conducting cybersecurity analyses in response to request messages, as shown in FIG. 5, the management subsystem 250 may invoke (or alternatively cause the DMAE 240 to invoke) one or more plug-ins to generate additional cybersecurity intelligence based on analyses of stored cybersecurity intelligence within the global data store 260. As shown, in response to a triggering event, the management subsystem 250 may invoke the retroactive re-classification logic (e.g., retroactive re-classification plug-in $290_6$) which may be registered with the management subsystem 250 (or the DMAE 240 when the plug-in $290_6$ is deployed as part of the DMAE 240 as shown in FIG. 2B). The retroactive re-classification plug-in $290_6$ is configured to monitor, confirm and perform system-wide correction of prior false positive (FP) and/or false negative (FN) results on a customer or system-wide basis.

In particular, the retroactive re-classification plug-in $290_6$ may prompt the data management logic (not shown) within the DMAE 240 to conduct an analysis of the stored meta-information within the global data store 260 to determine whether there exist any verdicts that conflict with trusted (e.g., high level of confidence in its accuracy) cybersecurity intelligence, including an analysis for any inconsistent verdicts for the same artifact. Moreover, the retroactive re-classification plug-in $290_6$ may conduct an analysis of the global data store 260 to identify different entries of meta-information associated with the same prior evaluated artifact, but having inconsistent verdicts. After identification, the retroactive re-classification plug-in $290_6$ conducts an analysis of the meta-information associated with each of the inconsistent verdicts in efforts to ascertain which of the inconsistent verdicts represents a correct classification for the prior evaluated artifact.

Upon completing the analysis, according to one embodiment of the disclosure, the retroactive re-classification plug-in $290_6$ applies a tag to each incorrect verdict. In lieu of being tagged, it is contemplated that the incorrect verdicts may be stored within a portion of the global data store 260 or a separate database (not shown). Independent of the selected mechanism to identify the incorrect verdicts, according to one embodiment of the disclosure, the operations of the retroactive re-classification plug-in $290_6$ have completed and notification of any affected customers that received the incorrect verdicts is performed by a reclassification notification plug-in $290_4$ (described below). Alternatively, in lieu of a separate plug-in $290_4$, the retroactive re-classification plug-in $290_6$ may be configured with the notification functionality of the reclassification notification plug-in $290_4$.

According to one embodiment of the disclosure, the reclassification notification plug-in $290_4$ may be configured to notify the affected customers through a variety of push/pull notification schemes. As an illustrative example, upon completion of the analysis and in according with a push notification scheme, the reclassification notification plug-in $290_4$ deployed within the DMAE 240 may notify a contact for the customer (e.g., security administrator), via a report or an alert (notification), that one or more incorrect verdicts previously provided to the customer have been detected. It is contemplated that the notification may be sent to one or more cybersecurity sensors associated with affected customers to the network interface 500 as represented by path 550. Additionally, or in the alternative, the notification may be sent via the portal 245 (e.g., administrative or customer portal). Also, as an alternative or additional transmission path, the notification may be sent to the security administrator via an out-of-band transmission path (e.g., as a text message, email, or phone message).

In lieu of a push delivery, as described above, an authorized administrator, cybersecurity provider or customer may periodically (or aperiodically) issue a request (query) message for updated verdicts via the portal 245 (e.g., administrative portal or customer portal). In response to the query message 560, the DMAE 240 activates the reclassification notification plug-in $290_4$, which identifies the incorrect verdicts associated with that customer and assists the DMAE 240 in providing a report 565 identifying these incorrect verdicts via the portal 245. According to one embodiment of the disclosure, it is contemplated that prior (or in response) to the query message 560, the DMAE 240 may collect and provide consolidated meta-information associated with the corrected verdicts to one or more cybersecurity sensors associated with the affected customers via path 550. This consolidated meta-information updates each sensor's data store with the corrected verdicts, and each sensor may provide at least a portion of consolidated meta-information to their supported endpoints. Also, the downloaded, consolidated meta-information assists an administrator (or customer) in updating its system resources (e.g., data store(s) in affected sensors, local data store(s) in affected endpoints, etc.), which allows for verification that the corrected verdicts have been loaded into these resources.

It is contemplated that an authorized administrators and cybersecurity providers may upload meta-information into the global data store 260 via a path 570 including the portal 245, the management subsystem 250 and the DMAE 240. Also, the authorized administrators, cybersecurity providers or customers may conduct searches to retrieve certain stored meta-information from the global data store 260 via path 575 to receive enhanced reports that provide information globally available across the entire platform. As an illustrative example, after credentials are authenticated by the portal 245, an authorized requester may initiate a search with select search parameters to retrieve meta-information such as (i) reclassified verdicts (as described above) or (ii) any grouping of meta-information stored within the global data store 260. The grouping may be directed a certain artifact type (e.g., executable or type of executable, particular type of non-executable, etc.), a certain source (e.g., particular sensor or endpoint), a certain IOC (or identified malware name), certain malicious website, or the like. The search parameters may be further refined based on a selected date/time range.

V. Plug-In Deployment

Referring now to FIG. 6, a block diagram of an illustrative sets of plug-ins $290_1$-$290_N$ operating as part of or in conjunction with the DMAE 240 of FIGS. 2A-2C is shown. Installed and registered with logic within the DMAE 240, the plurality of plug-ins $290_1$-$290_N$ may be separated into sets based on a plurality of selected factors. For illustrative purposes, some of these factors may include (i) whether the plug-in is invoked in response to a request message initiated by a consumer, (ii) general response time needed for the request message (e.g., same communication session, etc.), and (iii) whether the plug-in is activated by a triggering event.

Herein, each plug-in $290_1$-$290_N$ is configured to perform cybersecurity analyses in which the results are returned to the analytics logic 280 of FIG. 2B-2C. As a result, the plug-in $290_1$-$290_N$ are used to enhance functionality of the cybersecurity intelligence hub without changes to the overall architecture, and thus, from time to time, a certain subset of the plug-ins $290_1$-$290_N$ may be installed to adjust operability of the cybersecurity intelligence hub based on the current cybersecurity landscape. For instance, upon detecting a greater number of attacks directed to a particular artifact (e.g., Windows®-based executable), it is contemplated that an additional plug-in may be installed and configured to perform operations directed to that specific type of artifact (object). Hence, the plug-ins $290_1$-$290_N$ provide flexibility in the types and degrees of analyses conducted for cyber-attack detection and prevention.

For one embodiment of the disclosure, referring back to FIG. 2B, the analytics logic 280 is configured to receive analysis results from a particular plug-in (e.g., plug-in $290_1$). Based on the received analysis results and operating in accordance with the analytic rules 282 (e.g., consolidated verdict determination rules 283, analysis ordering rules 281, etc.), the analytics logic 280 generates and provides an output (e.g., consolidated verdict and/or meta-information providing enhanced cybersecurity insights or recommendations) to one or more destinations. These destinations may include a cybersecurity sensor, a network device under control by an administrator (via the administrative portal), a network device under control by a customer (via the customer portal), and/or another (different) plug-in $290_1$-$290_N$ to perform additional analyses before the analytics logic 280 generates and provides the output. It is also contemplated that the analytics logic 280 may update meta-information within the global data store 260 after such operations. As illustrative plugins, the plurality of plug-ins $290_1$-$290_N$ may include the first set of plugs 292, the second set of plug-ins 294, and the third set of plugs 296, as described above.

According to another embodiment of the disclosure as shown in FIG. 2C, the analytics logic 280, data management logic 285 and the management subsystem 250 may be operating in accordance with the analytic rules 282. Each of these logic units is configured to receive analysis results from a particular set of plug-in, and thereafter, generate and provide an output to one or more destinations as described above. The provided output may include consolidated verdict and/or meta-information such as a recommendation, contextual information, notifications of past incorrect verdicts, and/or enhanced cybersecurity insights such as metadata identifying a campaign (e.g., multiple malicious artifacts sharing similarities such as similar format or code structure, similar source or destination, etc.) or a trend (e.g., multiple actors using the same approach such as attack procedures, specific type of malicious executable utilized, etc.).

It is also contemplated that the analytics logic 280 (and/or data management logic 285 or management subsystem 250) may store meta-information into the global data store 260 after such operations. As illustrative plugins, the plurality of plug-ins $290_1$-$290_N$ may include the first set of plugs 292, the second set of 294, and the third set of plugs 296, as described herein.

A. Illustrative Example—First Set of Plug-Ins

A first plug-in $290_1$ may be configured to conduct an analysis of meta-information representing an artifact, which is provided by a requesting cybersecurity sensor or another information consumer, to determine whether the artifact should be classified as "benign". More specifically, the first plug-in $290_1$ receives as input, from the analytics logic, meta-information 600 associated with the artifact included in a request message. The meta-information 600 may include distinctive metadata, which may be used by the first plug-in $290_1$ to determine whether there is sufficient evidence, based on comparison of the distinctive metadata to cybersecurity intelligence directed to known benign artifacts stored within the global data store 260, to classify the object as "benign" and provide an analysis result 605 (e.g., one or more verdicts and related meta-information as a result).

As an illustrative example, the meta-information 600 includes a hash value of the artifact (i.e., object). The hash value is compared against known benign hash values (e.g., using whitelist and other cybersecurity intelligence) as well as hash values associated with prior evaluated artifacts. Based on its findings, the first plug-in $290_1$ determines whether the artifact (represented by the hash value) is benign and provides the result 605 to the analytics logic (not shown). Thereafter, based on the consolidated verdict determination rules, the analytics logic processes the result to determine a consolidated verdict for return as a response to the request message.

A second plug-in $290_2$ may be configured to conduct an analysis of meta-information representing an artifact, which is provided by a requesting cybersecurity sensor or another information consumer, to determine whether the artifact should be classified as "malicious". Similar to the description above, the second plug-in $290_2$ receives as input, from the analytics logic (see FIG. 2A), meta-information 610 associated with the artifact included in a request message. The meta-information 610 may include distinctive metadata, which may be used by the second plug-in $290_2$ to determine whether there is sufficient evidence, based on comparison of the distinctive metadata to cybersecurity intelligence directed to known malicious artifacts stored within the global data store 260, to classify the object as "malicious" and provide the analysis result 615.

As an illustrative example, the meta-information 610 includes a hash value of the artifact (i.e., object). The hash value is compared against known malicious hash values (e.g., using blacklist and other cybersecurity intelligence) as well as analysis of verdicts associated with prior evaluated artifacts with a matching hash value. Based on its findings, the second plug-in $290_2$ determines whether the artifact (represented by the hash value) is malicious and provides the result 615 to the analytics logic (not shown). Thereafter, as described above, a consolidated verdict for the artifact is determined and a response to the request message is provided with the consolidated verdict (and meta-information associated with the consolidated verdict).

Similar in operation to plug-ins $290_1$ and $290_2$, a third plug-in $290_3$ may be configured to conduct an analysis of meta-information representing an artifact, which is provided by a requesting cybersecurity sensor or another information consumer, to determine whether the artifact should be classified as "unknown," neither benign nor malicious. As input, the third plug-in $290_3$ receives, from the analytics logic, meta-information 620 associated with an artifact. The meta-information 620 may include distinctive metadata (as described above) for use in locating meta-information associated with one or more prior evaluated artifacts correspond to the artifact residing in the global data store and other stored cybersecurity intelligence (e.g., analyst analyses, third party sources, whitelists, blacklists, etc.). Upon determining that there is insufficient evidence to classify the artifact as "malicious" or "benign," the third plug-in $290_3$ provides a result 625 identifying an "unknown" classification for the artifact based on its analysis of the meta-information 620. The analytics logic determines the consolidated verdict, which may be sent with related meta-information including a recommendation.

According to one embodiment of the disclosure, the recommendation may initiate or prompt (suggest) the additional analysis of the artifact based on knowledge of the capabilities of the source issuing the request message that may be stored as a portion of meta-information within the global data store 260. For example, where the meta-information 620 identifies the source of the request message as a cybersecurity sensor equipped to perform only limited artifact analytics (e.g., no behavioral malware analysis capabilities), the recommendation included in the result 625 may be directed to additional static analyses that may be handled by the sensor and/or include information (e.g., link, instruction, etc.) that may cause the cybersecurity sensor to submit the artifact to an analysis system remotely located from the sensor. Alternatively, where the meta-information 620 identifies the source of the request message as a cybersecurity sensor equipped to perform any cybersecurity analysis (e.g., static malware analysis, behavioral malware analysis, and/or inspection through machine learning models), the recommendation may prompt the cybersecurity sensor to perform or initiate one or more of such analyses at the sensor.

Besides the type of additional analysis or analyses, the recommendation may include a selected order of analyses or identify certain characteristics or behaviors of importance in a more detailed analysis of the artifact at the sensor. The characteristics may be directed to particular aspects associated with the structure and content of the artifact (e.g., code structure, patterns or signatures of bytes forming the object, etc.). The behaviors may be identified as certain behaviors that should be monitored at run-time within a virtual machine or may constitute events detected using machine-learning models. The recommendation may further include a selected order of additional plug-in analyses that may assist in determining a known verdict for the artifact (e.g., verdicts indicate benign, but the benign artifacts have certain abnormalities (described below) that may suggest submission of the consolidated meta-information from the third plug-in $290_3$ to an eighth (campaign) plug-in $290_8$.

As an alternative embodiment, it is contemplated that the first, second and third plug-ins $290_1$-$290_3$ may be configured to determine the consolidated verdict and provide the same to the analytics logic 280. For this embodiment, the analytics logic 280 may either provide the consolidated verdict to the requesting entity (e.g., cybersecurity sensor) or alter the provided consolidated verdict if the analytic rules 282 feature constraints on the analytics logic 280 providing known verdicts and those constraints are not satisfied, as described above.

B. Illustrative Example—Second Set of Plug-Ins

A fourth plug-in $290_4$ may be configured to generate a response 635 to meta-information 630 configured to identify inconsistent verdicts associated with a particular consumer, such as a particular network device (identified by the submitted Device_ID) or a particular customer (identified by the submitted Customer_ID). These inconsistent verdicts may be detected based on operations performed by the sixth (retroactive reclassification) plug-in $290_6$ described below. Upon receipt of a query for updated verdicts from a consumer, the analytics logic invokes the fourth plug-in $290_4$ and passes the information associated with the query, including the Customer_ID, to the plug-in $290_4$. The plug-in $290_4$ processes the query and returns prior analyses results for that particular customer that are inconsistent for the same artifact.

Additionally, the fourth plug-in $290_4$ may be configured to generate a verdict update message or provide meta-information for the generation of this message by logic within the DMAE (e.g. analytics logic). The verdict update message identifies one or more of the inconsistent verdicts detected by the sixth (retroactive reclassification) plug-in $290_6$ and corrected within the global data store. The verdict update message provides meta-information that identifies which verdicts have been incorrectly classified and the correct verdicts (e.g., "malicious" corrected as "benign"; "benign" corrected as "malicious", etc.). The verdict update message may be utilized by one or more cybersecurity sensors to alter stored meta-information within their data store(s) and/or local data stores within endpoints supported by these cybersecurity sensor(s).

A fifth plug-in $290_5$ may be configured to receive cybersecurity information regarding previously encountered incidents exhibiting one or more identified IOCs 640, which may be utilized as a search index. The received cybersecurity information may be used to augment stored cybersecurity intelligence within the global data store, where the augmented cybersecurity intelligence may be subsequently accessed via an administrative portal by the incident responder to receive contextual information 645. The contextual information may enhance understanding of the artifact under analysis that may assist in the current incident investigation and provide context to the results of this investigation, which may be included in a report to the customer who commissioned the investigation or may be used in verifying the results of the investigation.

C. Illustrative Example—Third Set of Plug-Ins

The sixth plug-in $290_6$ (Retroactive Reclassification) may be invoked in response to a triggering event 650, such as a scheduled event (e.g., timeout, max count, etc.) or a dynamic event (e.g., administrator-initiated or plug-in generated event). Once invoked, the sixth plug-in $290_6$ is configured to perform a platform-wide, reclassification analysis of meta-information within the global data store 260 of FIG. 2A for any conflicts between the meta-information and trusted cybersecurity intelligence (e.g., verdicts now considered to be incorrect based on new intelligence such as determination of a hijacked website or a malicious web domain, etc.) and/or any abnormalities (e.g., inconsistent verdicts, verdicts that are based on stale meta-information that renders them suspect or incorrect, or in some cases, earlier benign verdict(s) for which a later discovered trend or campaign would indicate that these earlier benign verdict(s) may be suspect and the corresponding artifact(s) should be reclassified as malicious), where such conflicts or abnormalities may identify incorrect verdicts 655 associated with stored meta-information representing a false positive (FP) and/or false negative (FN).

According to one embodiment, the reclassification analysis may be initiated by the triggering event 650, which may include one or more search parameters for this analysis. The search parameters may be time-based (e.g., reclassification analysis directed to entries of the global data store that are newly created or modified within a prescribed period of time), customer-based (e.g., reclassification analysis directed to a specific customer selected in accordance with a round-robin selection scheme or a weighted scheme where the frequency of the analysis is dependent on a subscription level paid by the customer for the services offered by the cybersecurity intelligence hub), industry-based, or the like. Additionally, or in the alternative, the reclassification analysis may be initiated by an administrator via the administrative portal, where the search parameters may be directed to a particular time frame, a particular customer, a particular submission from a cybersecurity sensor, a particular artifact (based on selected distinctive metadata such as hash value, source IP address, etc.), or the like.

As described above, the retroactive re-classification plug-in $290_6$ may control operations of the data management logic in accessing meta-information within the global data store to identify conflicts with trusted cybersecurity intelligence. For example, based on newly available cybersecurity intelligence (e.g., identification of a malicious source such as a malicious website), the retroactive re-classification plug-in $290_6$ may conduct an analysis of stored meta-information within the global data store to identify any meta-information including a source address (e.g., IP address, domain name, etc.) for a currently identified malicious website separate from analysis of the consistency of the verdicts as described below. Each verdict associated with the detected meta-information sourced by the malicious website is set to a "malicious" classification.

As another example, the retroactive re-classification plug-in $290_6$ may conduct an analysis of the global data store 260 to identify any inconsistent verdicts for the same, prior evaluated artifact. After identification, the retroactive re-classification plug-in $290_6$ conducts an analysis of the stored meta-information associated with each of the inconsistent verdicts in efforts to ascertain which of the inconsistent verdicts represents a correct classification for the prior evaluated artifact. This analysis may include determining differences that may give rise to different verdicts such as differences in (i) operating environment utilized in assigning a verdict to the prior evaluated artifact that may be included as part of the stored meta-information (e.g., type of guest image, application or OS; amount of compute time expended based on load; date/time of processing; geographic location, etc.), (ii) characteristics of the artifact (e.g., format, enabled features, port configurations, etc.), (iii) the type of analysis conducted to render the verdict, (iv) source of the artifact, or the like.

Upon completing the analysis, according to one embodiment of the disclosure, the retroactive re-classification plug-in $290_6$ may apply a tag to each incorrect verdict. In lieu of being tagged, it is contemplated that the incorrect verdicts may be stored within a portion of the global data store or a separate database (not shown). Therefore, the operations of the retroactive re-classification plug-in $290_6$ have completed and notification of any affected customers that received the incorrect verdicts may be initiated in response to the reclassification notification plug-in $290_4$ (described above). Alternatively, in lieu of a separate plug-in $290_4$, the retroactive re-classification plug-in $290_6$ may be configured with the notification functionality of the reclassification notification plug-in $290_4$.

As described above, the sixth plug-in $290_6$ may be configured to identify the inconsistent verdicts and tag the entry or entries associated with the incorrect verdicts. Additionally, the stored meta-information associated with the incorrect verdicts may be analyzed, by logic within the DMAE (see FIGS. 2B-2C) or the sixth plug-in $290_6$, to identify whether one of these prior analyses has a higher propensity for accuracy than the other. As a first illustrative example, where meta-information associated with a prior evaluated artifact is initially classified with a "benign" (benign verdict) by a first source, and subsequently, meta-information associated with the prior evaluated artifact is classified with a "malicious" verdict by a second source conducting greater in-depth analysis, the sixth plug-in $290_6$ may retroactively re-classify the meta-information from the first source as "malicious" (tagging the meta-information from the first source, modifying or initiating modification of the verdict the verdict associated with the meta-information from the first source). Herein, the retroactive re-classification may occur because the analysis techniques commenced at the first source are not as robust as a static or behavioral malware analysis performed by the second source.

As a second illustrative example, referencing the inconsistent verdicts between the first and second sources described above, both the first and second sources may perform a behavioral malware analysis, but use different software images resulting in different verdicts (for example, where the second source uses a software image with software more vulnerable to an exploit than the software image of the first source). Herein, the sixth plug-in $290_6$ may retroactively re-classify the meta-information from the first source as "malicious" as the artifact is malicious even though the software image utilized by the first source, given its ability to more advanced operability, may inherently require a high level of maliciousness to consider the artifact as part of a cyber-attack.

Furthermore, it is contemplated that, given the uncovered conflicts or abnormalities as described above, the sixth plug-in $290_6$ may be configured to prompt the data management logic 285 or the analytics logic 280 (see FIGS. 2B-2C) to alter the consolidated verdict for the artifact featuring inconsistent verdicts to be of an "unknown" classification. By altering the classification, the cybersecurity intelligence hub 110 may cause further detailed analyses of the artifact to determine a known, consolidated verdict with a greater level of confidence as to its accuracy.

The seventh and eighth plug-ins $290_7$ and $290_8$ may be directed to trend identification and campaign detection. For trend identification, in response to a triggering event 660, the seventh plug-in $290_7$ is activated and analyzes meta-information within entries of the global data store 260, including meta-information with "benign" and "malicious" verdicts, to identify (from the analyzed meta-information) malicious actors using the same approach in conducting a cyber-attack. These trends may be more verifiable when considering timing of cyber-attacks (e.g., time of day, frequency within a prescribed duration, etc.). The results of the analysis (trend information) 665 is reported to logic within the DMAE.

For example, the seventh plug-in $290_7$ may conduct analyses to detect substantially increasing number of "malicious" verdicts associated with stored meta-information within the global data store, where the meta-information is received from different sources and directed to a certain type of artifact (e.g., Windows® OS based executables). The increasing number may be representative of an increase (in percentage) of newly stored meta-information associated with a Windows® OS based executable over a prescribed time range (e.g., last two-weeks of the month) that exceeds a certain threshold. If so, a trend may be detected as to a wide-scale cyber-attack on Windows® OS based executable and further analysis may be conducted to identify the characteristics of the trend (e.g., directed to a certain version of the Windows® OS, time of attack which may signify origin, certain registry keys targeted, etc.). During the trend analysis, it is contemplated that the detection of certain factors (e.g., heavy concentration directed to a certain customer or class of customers, or to a particular network device) may cause the seventh plug-in $290_7$ to trigger the campaign detection plug-in $290_8$ to further analyze a portion of the meta-information collected during the trend analysis.

Based on the findings, the plug-in $290_7$ may provide the analytic results to the analytics logic, which may generate a notification operating as a warning to the one or more customers about the cybersecurity landscape currently determined by the cybersecurity intelligence hub.

For campaign detection, in response to a triggering event, the plug-in $290_8$ is activated and analyzes meta-information 670 with entries of the global data store 260 including "malicious" verdicts only. Such analyses are performed to identify targeted and deliberate cyber-attacks based on repetitious attempts to the same network device, the same customer, or the same industry, etc. The result of such analysis (campaign information) 675 may be reported to logic within the DMAE, which generates a notification to associated customers for transmission via the customer portal or an out-of-band transmission path (e.g., as a text message, email, or phone message).

More specifically, the plug-in $290_8$ conducts an analysis focused on meta-information with "malicious" verdicts and grouping meta-information sharing similarities. For instance, a campaign analysis may be conducted for meta-information associated with artifacts originated from the same or similar source (e.g., a particular web domain, IP address or geographic location, etc.) or meta-information submissions originating from the same cybersecurity sensor and/or endpoint that denote a concentrated cyber-attack on a particular enterprise and/or device. Based on the findings, the plug-in $290_8$ may provide results to be reported to the customer (if a customer-based campaign) or genericized and reported to multiple customers (if an industry-wide campaign).

The ninth plug-in $290_9$ is directed to identifying sophisticated cyber-attacks targeting different devices, customers or industries, etc., by collecting meta-information 680 with malicious verdicts for these different devices, customers or industries. From the collected meta-information 680, logic within the plug-in $290_9$ operates to detect similarities associated with meta-information within the different devices, customers or industries.

More specifically, the correlation plug-in $290_9$ performs a correlation operation across the stored cybersecurity intelligence within the global data store to assimilate related artifacts to develop consolidated meta-information to spot more sophisticated cyber-attacks that may be hidden from spot analysis by a single source. Such sophisticated attacks may include those using, for example, multiple attack stages and/or multiple vectors and/or aimed at multiple targets. The analysis results 685 are reported to logic within the DMAE for subsequent transmission as a report to one or more customers.

Figure 7:
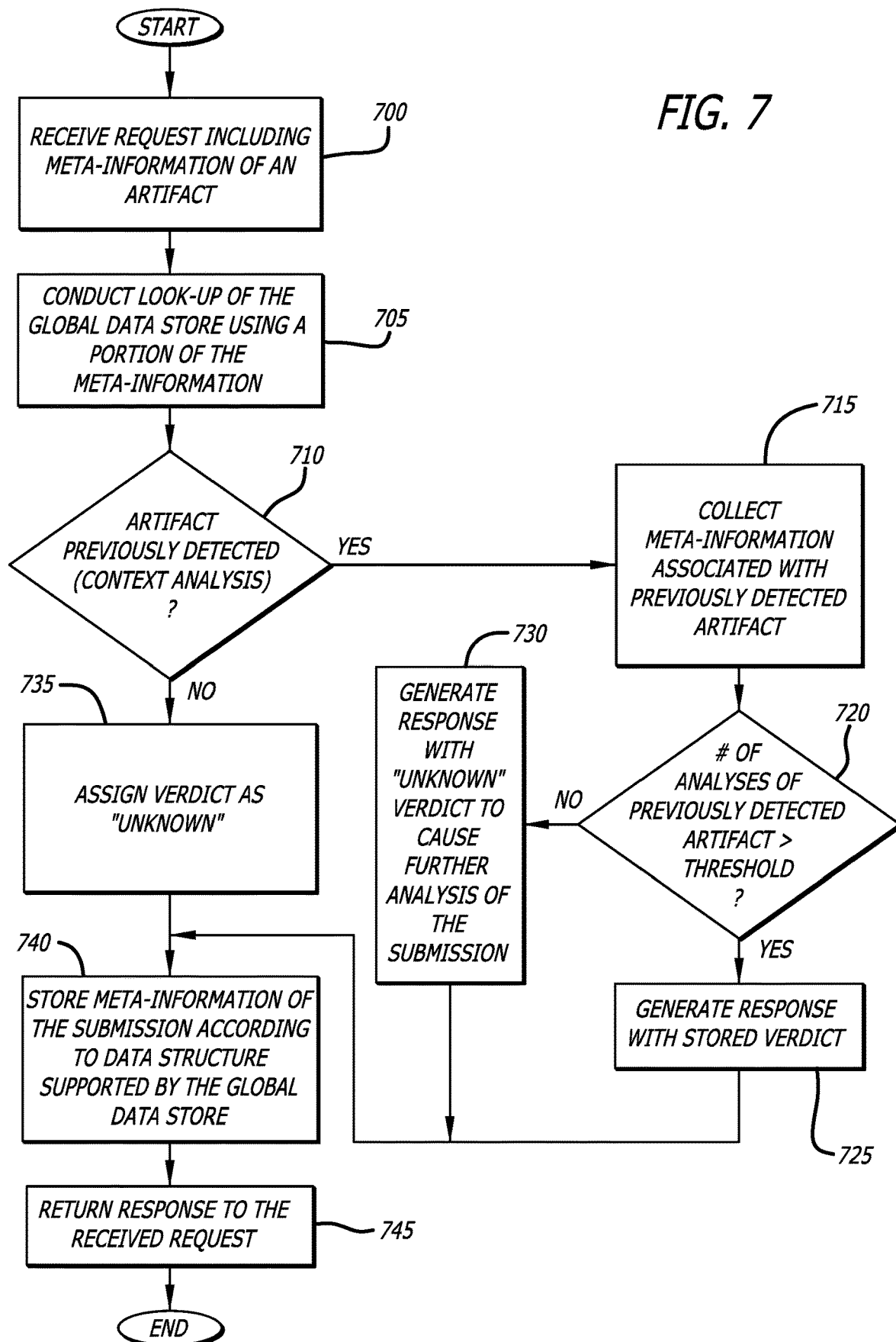
FIG. 7 is an exemplary flow diagram of operations conducted by a plug-in of a first set of plug-ins deployed within the cybersecurity intelligence hub of FIG. 2A for responding to low-latency requests for analytics associated with a selected object.

Referring to FIG. 7, an illustrative flow diagram of operations conducted by a plug-in deployed within the cybersecurity intelligence hub 110 of FIG. 2A for responding to a request message for analytics associated with a selected artifact is shown. According to this embodiment of the disclosure, a request message including meta-information associated with an artifact (e.g., executable, non-executable, collection of information associated with a logon or network connection activity) is received (block 700). Using at least a portion of the meta-information associated with the artifact (e.g., distinctive metadata), a review of entries within the global data store is conducted to determine if any prior analyses for the artifact have been stored (block 705).

According to one embodiment of the disclosure, it is contemplated that the global data store may be segmented into and organized as different caches (e.g., different levels; same level, but different cache structures; different cache structures organized to store meta-information associated with analyses of prior evaluated artifacts received within prescribed time ranges, etc.). For instance, a first cache may be configured to maintain meta-information associated with analyses conducted on prior evaluated artifacts during a current calendar day. A second (larger sized) cache may be configured to maintain meta-information uploaded associated with analyses conducted on prior evaluated artifacts during the current week, etc.).

Upon determining that the stored meta-information associated with a prior evaluated artifact matching the artifact (or activity) has been previously stored (block 710), this stored meta-information, including a stored verdict is collected and a response message including the stored consolidated meta-information for the prior evaluated artifact (or activity) is generated (blocks 715 and 725). As an optional operation, prior to generating the response message, a determination is made as to whether the number of stored evaluations of the artifact exceeds a verdict threshold (block 720). If so, the response message including at least the known verdict (e.g., malicious or benign) is generated as set forth in block 725. Otherwise, the response message is generated with an "unknown" verdict to prompt further malware analyses of the artifact and subsequent storage of the malware analysis results into the global data store within one or more entries allocated to the artifact (block 730). Besides the verdict, additional meta-information extracted from the one or more entries associated with the prior evaluated artifact is included in the response message.

If the meta-information associated with a prior evaluated artifact has not been previously stored in the global data store, the verdict associated with the artifact is set to an "unknown" classification. Thereafter, further analyses (or retrieval of the object for analysis) may be conducted in efforts to determine a definitive classification (e.g., malicious or benign) for the artifact (block 735). The meta-information associated with the artifact (or activity) is stored in the global data store (block 740). The response message is returned to the requesting consumer (block 745).

Figure 8:
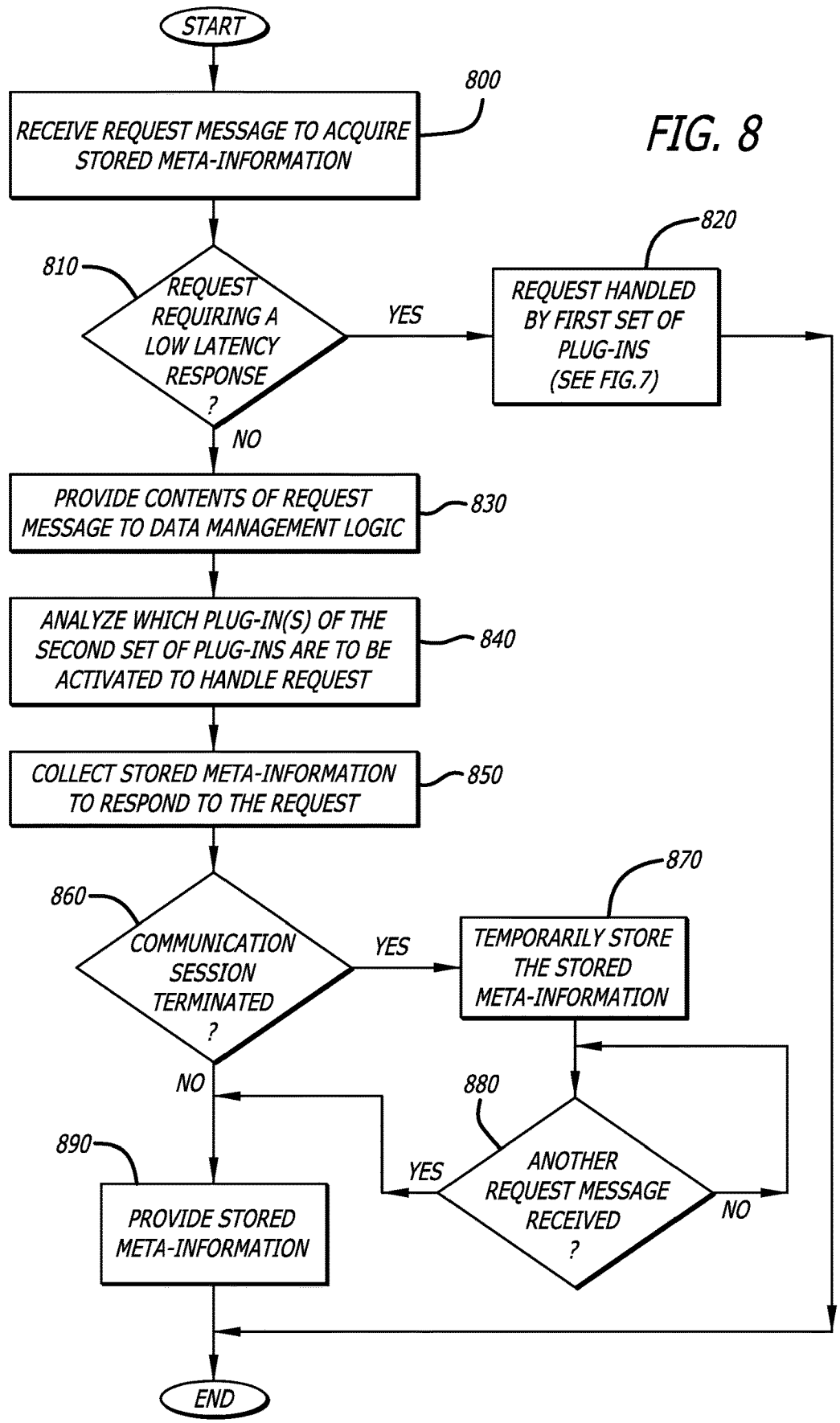
FIG. 8 is an exemplary flow diagram of operations conducted by a plug-in of a second set of plug-ins deployed within the cybersecurity intelligence hub of FIG. 2A for responding to requests for analytics.

Referring now to FIG. 8, an illustrative flow diagram of operations conducted by a plug-in deployed within the cybersecurity intelligence hub of FIG. 2A for responding to a request message for analytics is shown. Herein, according to one embodiment of the disclosure, a request message directed to acquiring stored meta-information from the global data store is received from a customer (block 800). Analytics logic within the cybersecurity intelligence hub determines whether the request message is directed to low-latency request to be handled by the first set of plug-ins (block 810). If so, the request message is handled during the same communication session as illustrated in FIG. 7 and described above (block 820). Otherwise, the request message is handled at a higher latency (e.g., lower priority) than the low-latency requests and the contents of the request message are provided to the data management logic (block 830).

The data management logic analyzes the incoming content of the request message to determine which plug-in(s) are activated to perform the requisite operations to service the request message (block 840). Also, the plug-in(s) may collect information in responding to the request message after the communication session initiated by the request message has terminated (block 850). If the communication session has terminated, the obtained information may be temporarily stored in the global data store or a type of temporary storage such as a volatile memory (blocks 860 and 870). In response to receiving another request message from the customer, the obtained information is returned to the customer (blocks 880 and 890), although not shown, the obtained information may be provided to the customer in lieu of the "pull" delivery scheme described above.

Figure 9:
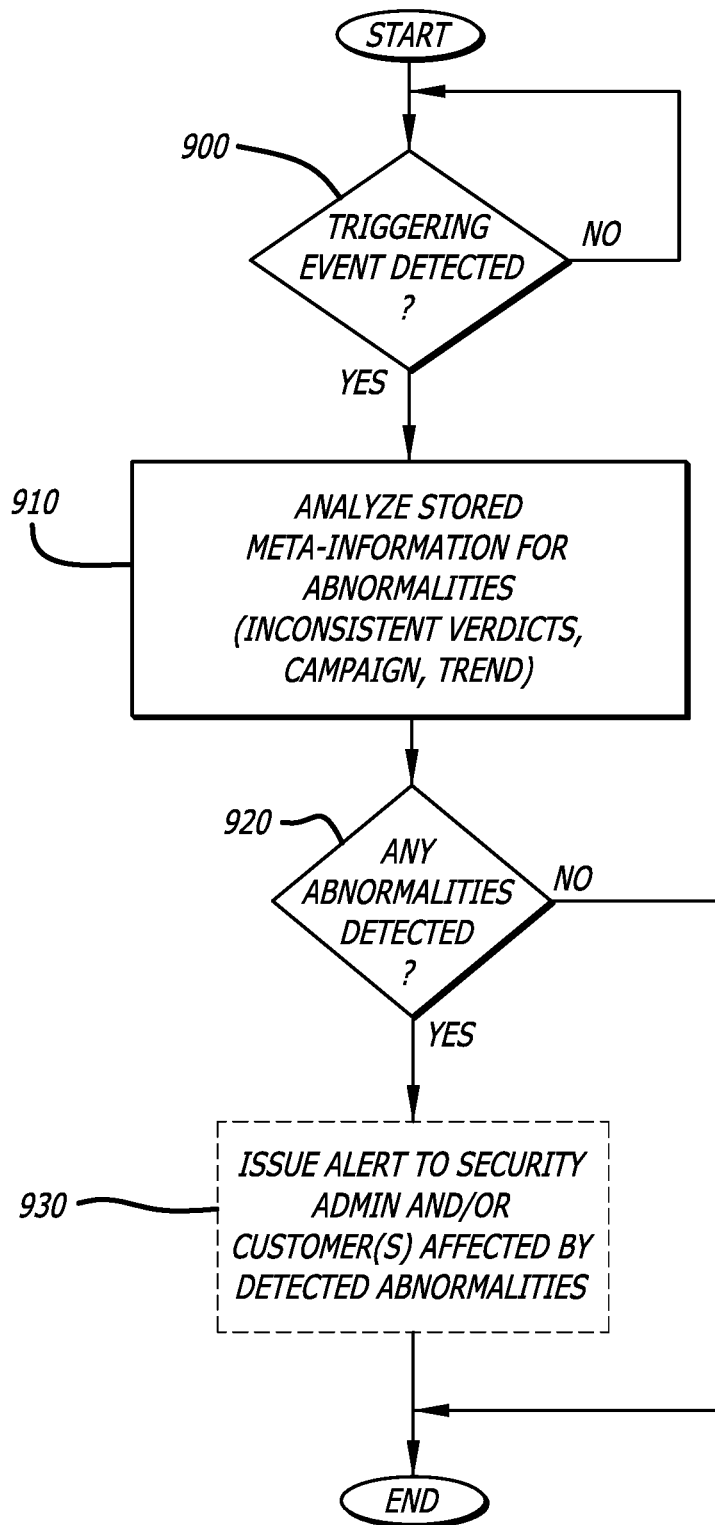
FIG. 9 is an exemplary flow diagram of operations conducted by a plug-in of a third set of plug-ins deployed within the cybersecurity intelligence hub of FIG. 2A in analyzing stored cybersecurity intelligence and generating additional cybersecurity intelligence based on the analyzed, stored cybersecurity intelligence.

Referring to FIG. 9, an exemplary flow diagram of operations conducted by a plug-in of the cybersecurity intelligence hub of FIG. 2A in response to a configurable, triggering event, a particular plug-in is activated to analyze the stored meta-information within the global data store to determine whether any abnormalities (e.g., inconsistent verdicts, or stale verdicts that are now incorrect based on additional intelligence including determination of potential trends or campaigns, etc.) are determined (blocks 900-910). For example, where the plug-in is a retroactive re-classification plug-in and upon confirmation of a re-classification event as described above, the updated cybersecurity intelligence (e.g., confirmed consolidated verdict) is provided to the sources that previously received incorrect consolidated verdicts (block 920). If any abnormalities are detected, a notification (e.g., an alert) may be issued to security administrator (block 930).

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A system for detecting artifacts associated with a cyber-attack, comprising:
   a first network device corresponding to physical electronic device featuring network connection functionality; and
   a second network device remotely located from and communicatively coupled over a network to the first network device, the second network device comprises
   a data store including meta-information associated with each prior evaluated artifact of a plurality of prior evaluated artifacts, wherein stored meta-information associated with a prior evaluated artifact of the plurality of prior evaluated artifacts corresponds to meta-information associated with a previously analyzed object and includes a verdict classifying the prior evaluated artifact as malicious or benign, and retroactive reclassification logic being configured to analyze the stored meta-information associated with the prior evaluated artifact to identify inconsistent verdicts for the same prior evaluated artifact, wherein in response to identifying inconsistent verdicts associated with the prior evaluated artifact, re-classifying the verdict associated with the prior evaluated artifact with a selected verdict determined to be a correct classification for the prior evaluated artifact by at least conducting an analysis of the stored meta-information associated with each of the inconsistent verdicts and determining differences that could have given rise to the inconsistent verdicts, including (i) an operating environment utilized in assigning the verdict to the prior evaluated artifact, (ii) characteristics of the prior evaluated artifact, (iii) type of analysis conducted to render the verdict, and (iv) source of the prior evaluated artifact, and conducting operations for notifying a customer associated with the first network device supplying at least a portion of the stored meta-information associated with the prior evaluated artifact that the verdict associated with the prior evaluated artifact could be incorrect.

2. The system of claim 1, wherein the retroactive reclassification logic of the second network device operates as a plug-in software module in communication with analytics logic deployed within the second network device, the analytics logic being configured to process and return one or more response messages to a request message operating as a query to via an administrative portal or a customer portal.

3. The system of claim 1, wherein the retroactive reclassification logic of the second network device being further configured to analyze the stored meta-information associated with the prior evaluated artifact and identify whether the verdict associated with the prior evaluated artifact is in conflict with trusted cybersecurity intelligence by at least identifying the stored meta-information includes a source address of a malicious website as detected by the trusted cybersecurity intelligence.

4. The system of claim 1, wherein the retroactive reclassification logic of the second network device being configured to conduct an analysis of the stored meta-information associated with the inconsistent verdicts for the same prior evaluated artifact by at least analyzing differences between an operating environment utilized in assigning a first verdict of the same prior evaluated artifact and an operating environment utilized in assigning a second verdict to the same prior evaluated artifact differing from the first verdict.

5. The system of claim 1, wherein the retroactive reclassification logic of the second network device being configured to conduct an analysis of the stored meta-information associated with the inconsistent verdicts for the same prior evaluated artifact by at least analyzing differences between a type of the cybersecurity analysis conducted to render the first verdict and a type of cybersecurity analysis conducted to render the second verdict.

6. The system of claim 1, wherein the retroactive reclassification logic of the second network device being configured to conduct an analysis of the stored meta-information associated with the inconsistent verdicts for the same prior evaluated artifact by at least analyzing differences between a source of the prior evaluated artifact associated with the first verdict and a source of the prior evaluated artifact associated with the second verdict.

7. The system of claim 1, wherein the retroactive reclassification logic of the second network device being configured to tag one or more of the inconsistent verdicts that are determined to correspond to one or more incorrect verdicts on subsequent cybersecurity analyses of the stored meta-information associated with the inconsistent verdicts.

8. The system of claim 7, wherein the second network device further comprises a reclassification notification plug-in, the reclassification notification plug-in to notify affected customers pertaining to the one or more incorrect verdicts.

9. The system of claim 7, wherein the second network device further comprises a reclassification notification plug-in, the reclassification notification plug-in is configured to retain tags associated with the one or more incorrect verdicts and notifies the customer of the one or more incorrect verdicts pertaining to the customer in response to a message initiated by the customer via a portal.

10. The system of claim 1, wherein the retroactive reclassification logic of the second network device being invoked in response to a triggering event, the triggering event includes a scheduled event that is conducted internally within the second network device.

11. A cybersecurity intelligence hub configured for network connectivity to a plurality of cybersecurity sensors to detect whether an artifact is associated with a cyber-attack without execution of the artifact, comprising:

a communication interface;

a hardware processor communicatively coupled to the communication interface;

a global data store communicatively coupled to the hardware processor, the global data store comprises meta-information associated with each prior evaluated artifact of a plurality of prior evaluated artifacts, wherein stored meta-information associated with a prior evaluated artifact of the plurality of prior evaluated artifacts corresponds to meta-information associated with a previously analyzed object and includes a verdict classifying the prior evaluated artifact as malicious or benign;

a memory communicatively coupled to the hardware processor, the memory including a data management and analytics engine including at least a retroactive reclassification logic being configured to analyze the stored meta-information associated with the prior evaluated artifact to (a) determine inconsistent verdicts for the same prior evaluated artifact, and (b) in response to at least identifying the inconsistent verdicts for the same prior evaluated artifact, re-classify the verdict associated with the prior evaluated artifact with a selected verdict determined to be a correct classification for the prior evaluated artifact by at least conducting an analysis of the stored meta-information associated with each of the inconsistent verdicts and determining differences that could have given rise to the inconsistent verdicts, including (i) an operating environment utilized in assigning the verdict to the prior evaluated artifact, (ii) characteristics of the prior evaluated artifact, (iii) type of analysis conducted to render the verdict, and (iv) source of the prior evaluated artifact, and reclassification notification logic configured to conduct operations for notifying a customer associated with a first network device supplying at least a portion of the stored meta-information associated with the prior evaluated artifact that the verdict associated with the prior evaluated artifact could be incorrect.

12. The cybersecurity intelligence hub of claim 11 further comprising analytics logic communicatively coupled to the retroactive reclassification logic, wherein the retroactive reclassification logic operates as a plug-in software module in communication with the analytics logic being configured to process and return one or more response messages to a request message operating as a query to via an administrative portal or a customer portal operating as the communication interface.

13. The cybersecurity intelligence hub of claim 11, wherein the retroactive reclassification logic being configured to identify whether the verdict associated with the prior evaluated artifact is in conflict with trusted cybersecurity intelligence including identifying the stored meta-information includes a source address of a malicious website as detected by the trusted cybersecurity intelligence.

14. The cybersecurity intelligence hub of claim 11, wherein the retroactive reclassification logic being configured to conduct an analysis of the stored meta-information associated with the inconsistent verdicts for the same prior evaluated artifact by at least analyzing differences in an operating environment utilized in assigning a first verdict of the same prior evaluated artifact and an operating environment utilized in assigning a second verdict to the same prior evaluated artifact differing from the first verdict.

15. The cybersecurity intelligence hub of claim 11, wherein the retroactive reclassification logic being configured to conduct an analysis of the stored meta-information associated with the inconsistent verdicts for the same prior evaluated artifact by at least analyzing differences between either (i) a type of the cybersecurity analysis conducted to render the first verdict and a type of cybersecurity analysis conducted to render the second verdict or (ii) a source of the prior evaluated artifact associated with the first verdict and a source of the prior evaluated artifact associated with the second verdict.

16. The cybersecurity intelligence hub of claim 11, wherein the retroactive reclassification logic being further configured to analyze the stored meta-information associated with the prior evaluated artifact to determine whether the verdict associated with the prior evaluated artifact is in conflict with trusted cybersecurity intelligence.

17. The cybersecurity intelligence hub of claim 11, wherein the retroactive reclassification logic being configured to tag one or more of the inconsistent verdicts that are determined to correspond to one or more incorrect verdicts on subsequent cybersecurity analyses of the stored meta-information associated with the inconsistent verdicts.

18. The cybersecurity intelligence hub of claim 17, wherein the reclassification notification logic operates as a plug-in and is configured to notify affected customers pertaining to the one or more incorrect verdicts.

19. The cybersecurity intelligence hub of claim 17, wherein the reclassification notification logic operates as a plug-in and is configured to retain tags associated with the one or more incorrect verdicts and notify a customer of the one or more incorrect verdicts pertaining to the customer in response to a message initiated by the customer via a portal.

20. The cybersecurity intelligence hub of claim 11, wherein the retroactive reclassification logic being invoked in response to a triggering event, the triggering event includes a scheduled event that is conducted internally within cybersecurity intelligence hub.

21. A computerized method for detecting artifacts associated with a cyber-attack, comprising:

storing meta-information associated with each prior evaluated artifact of a plurality of prior evaluated artifacts received from a plurality of cybersecurity intelligence sources located remotely from each other, each meta-information associated with a prior evaluated artifact of the plurality of prior evaluated artifacts includes a verdict classifying the prior evaluated artifact, the verdict being one of a plurality of classifications including a malicious classification or a benign classification;

analyzing the stored meta-information associated with the prior evaluated artifact to identify inconsistent verdicts for the prior evaluated artifact;

in response to identifying inconsistent verdicts associated with the prior evaluated artifact, re-classifying the verdict associated with the prior evaluated artifact with a selected verdict determined to be a correct classification for the prior evaluated artifact by at least conducting an analysis of the stored meta-information associated with each of the inconsistent verdicts and determining differences that could have given rise to the inconsistent verdicts, including (i) an operating environment utilized in assigning the verdict to the prior evaluated artifact, (ii) characteristics of the prior evaluated artifact, (iii) type of analysis conducted to render the verdict, and (iv) source of the prior evaluated artifact; and conducting operations for notifying a customer associated with a network device supplying at least a portion of the stored meta-information associated with the prior evaluated artifact that the verdict associated with the prior evaluated artifact could be incorrect.

22. A system comprising:

a data store being a non-transitory storage medium including meta-information associated with each prior evaluated artifact of a plurality of prior evaluated artifacts, wherein stored meta-information associated with a prior evaluated artifact of the plurality of prior evaluated artifacts corresponds to meta-information associated with a previously analyzed object and includes a verdict classifying the prior evaluated artifact as malicious or benign, a retroactive reclassification logic stored in the non-transitory storage medium, the retroactive reclassification logic being configured to analyze the stored meta-information associated with the prior evaluated artifact to (a) determine inconsistent verdicts for the same prior evaluated artifact, and (b) in response to at least identifying the inconsistent verdicts for the same prior evaluated artifact, re-classify the verdict associated with the prior evaluated artifact with a selected verdict determined to be a correct classification for the prior evaluated artifact by at least conducting an analysis of the stored meta-information associated with each of the inconsistent verdicts and determining differences that could have given rise to the inconsistent verdicts, including (i) an operating environment utilized in assigning the verdict to the prior evaluated artifact, (ii) characteristics of the prior evaluated artifact, (iii) type of analysis conducted to render the verdict, and (iv) source of the prior evaluated artifact, and reclassification notification logic configured to conduct operations for notifying a customer associated with a first network device supplying at least a portion of the stored meta-information associated with the prior evaluated artifact that the verdict associated with the prior evaluated artifact could be incorrect.

* * * * *